US008194270B2

(12) United States Patent
Takemoto et al.

(10) Patent No.: US 8,194,270 B2
(45) Date of Patent: Jun. 5, 2012

(54) PRINTING CONTROL METHOD AND PRINTING SYSTEM

(75) Inventors: Shuichi Takemoto, Mihara (JP); Norifumi Tasaka, Mihara (JP); Ikuo Ozaki, Hiroshima (JP)

(73) Assignee: Mitsubishi Heavy Industries Printing & Packaging Machinery, Ltd., Hiroshima (JP)

( * ) Notice: Subject to any disclaimer, the term of this patent is extended or adjusted under 35 U.S.C. 154(b) by 877 days.

(21) Appl. No.: 11/994,331

(22) PCT Filed: Jun. 30, 2006

(86) PCT No.: PCT/JP2006/313143

§ 371 (c)(1), (2), (4) Date: Nov. 10, 2008

(87) PCT Pub. No.: WO2007/004585

PCT Pub. Date: Jan. 11, 2007

(65) Prior Publication Data

US 2009/0091780 A1 Apr. 9, 2009

(30) Foreign Application Priority Data

Jun. 30, 2005 (JP) ................................ 2005-192846

(51) Int. Cl.
*G06F 3/12* (2006.01)

(52) U.S. Cl. ......... 358/1.15; 358/1.9; 358/1.18; 400/61; 400/719; 715/274

(58) Field of Classification Search ................. 358/1.15, 358/1.18, 1.9, 3.06; 400/719, 61, 62; 715/274
See application file for complete search history.

(56) References Cited

U.S. PATENT DOCUMENTS 5,467,436 A 11/1995 Rodi et al.
(Continued)

FOREIGN PATENT DOCUMENTS

DE 10060794 A1 6/2002
(Continued)

OTHER PUBLICATIONS

Search Report for EP 06 78 0700, mailed May 24, 2011.
(Continued)

*Primary Examiner* — Negussie Worku
(74) *Attorney, Agent, or Firm* — Kanesaka Berner & Partners, LLP

(57) ABSTRACT

An object of the present invention is to provide a printing control method and a printing controller which are capable of performing high-quality printing in a short period of time, and which are capable of reducing human error. To achieve this end, the printing control method is used to control a printing system, which is equipped with a server to store printing data which contains platemaking data and related information, a printing machine equipped with a plurality of printing presses, a terminal unit for acquiring the printing image data and outputting command information to the printing machine, detectors for detecting a state of a printed page, and controllers for controlling the printing presses based on the printing data and detection information. In a pre-printing step, the operating conditions of the printing machine are loaded from the server, a supply of ink is preset based on the printing data, one of a plurality of sets of data for selection is selected as printing data, platemaking data is displayed on a display unit, and the state of arrival of the platemaking plate data to the terminal unit and the data that arrived are confirmed. In a printing step, feedback control employing the detection information is performed based on the data sent from the terminal unit.

20 Claims, 17 Drawing Sheets

U.S. PATENT DOCUMENTS

| | | | | | |
|---|---|---|---|---|---|
| 5,791,250 | A | * | 8/1998 | Blake et al. | 101/483 |
| 5,897,260 | A | * | 4/1999 | Zingher | 400/719 |
| 5,964,156 | A | * | 10/1999 | Smith et al. | 101/471 |
| 5,992,324 | A | * | 11/1999 | Rombult et al. | 101/477 |
| 6,811,946 | B2 | * | 11/2004 | Shimomura et al. | 430/200 |
| 6,903,831 | B1 | * | 6/2005 | Rapke-Kraft et al. | 358/1.13 |
| 6,972,167 | B2 | * | 12/2005 | Aoshima | 430/270.1 |
| 6,976,425 | B2 | * | 12/2005 | Morikawa et al. | 101/364 |
| 7,351,773 | B2 | * | 4/2008 | Fujimaki | 525/437 |
| 7,463,220 | B2 | * | 12/2008 | Sakata et al. | 345/60 |
| 7,471,419 | B2 | * | 12/2008 | Nishide et al. | 358/1.9 |
| 7,561,290 | B2 | * | 7/2009 | Uejo | 358/1.15 |
| 7,605,937 | B2 | * | 10/2009 | Toyofuku | 358/1.15 |

FOREIGN PATENT DOCUMENTS

| | | |
|---|---|---|
| EP | 0878303 A2 | 11/1998 |
| JP | 8267724 | 10/1996 |
| JP | 9109370 | 4/1997 |
| JP | 9314813 | 12/1997 |
| JP | 10187401 | 7/1998 |
| JP | 2000-351201 | 12/2000 |
| JP | 2002-166616 | 6/2002 |
| JP | 2002337315 | 11/2002 |
| JP | 2003191446 | 7/2003 |
| JP | 2003231242 | 8/2003 |
| JP | 2004106523 | 4/2004 |
| JP | 2004195740 | 7/2004 |
| JP | 2004-322465 | 11/2004 |
| JP | 2004351929 | 12/2004 |
| JP | 2005-027124 | 1/2005 |

OTHER PUBLICATIONS

Notification of Reasons for Rejection dated Aug. 19, 2008 from the Japanese Patent Office.

Notification of Reasons for Rejection dated Sep. 5, 2006 from the Japanese Patent Office.

Decision of Rejection date Mar. 13, 2007 from the Japanese Patent Office.

Non-English Notification of Reasons for Rejection dated Feb. 19, 2008 from the Japanese Patent Office.

* cited by examiner

PRINTING CONTROL METHOD AND PRINTING SYSTEM

CROSS-REFERENCE TO RELATED APPLICATIONS

The present Application is based on International Application No. PCT/JP2006/313143, filed on Jun. 30, 2006, which in turn corresponds to Japanese Application No. 2005-192846, filed Jun. 30, 2005, and priority is hereby claimed under 35 USC §119 based on these applications. Each of these applications are hereby incorporated by reference in their entirety into the present application.

TECHNICAL FIELD

The present invention relates to a print preparation method, a print preparation system, a terminal unit for a print system, a program for a print system, and a recording medium for a print system preferably used to print newspapers in newspaper printing factories established in various places when publishing newspapers over a wide area such as the whole country.

BACKGROUND ART

For example, newspaper publishing companies that publish news papers over a wide area such as the whole country, to deliver the latest possible information to subscribers, generally adopt a system in which the editing of pages is collectively performed in the head office, while the printing of newspapers is performed in newspaper printing factories established in various places. In this case, newspaper printing factories receive the edited data from the head office through communication between them and, based on the printing data, make printing plates to carry out printing.

For instance, in a system such that the head office and newspaper printing factories of a newspaper publishing company are connected through a known network, the head office performs the editing of newspapers by an edit system that is used for compound media containing not only newspapers but also other media. The result of the editing is stored in the server of the head office as printing data and transmitted from the server to the newspaper printing factories.

In the newspaper printing factories, after a data server in each of the newspaper printing factories receives the printing data from the head office, the factory management system makes printing plates based on the received data. In the platemaking, for example, a CTP (Computer-To-Plate) machine or CTF (Computer-To-Film) machine is employed. In the CTP machine, a printing plate is output directly from the digital data. In the CTF machine, because a platemaking film is first output, a printing plate is made based on this film. The printing plate thus made is put on the corresponding plate cylinder of a rotary newspaper printing machine by hand.

Newspaper printing is particularly requested to not only provide subscribers with the latest information quickly but also provide information accurately. The newspaper printing is also requested to reproduce and provide image information with high fidelity as well as not to provide wrong character information. Because color printing of newspaper pages has recently been performed, it is necessary to reproduce color image information with high fidelity.

Conventionally, in a general printing machine such as a planographic offset printing machine, the platemaking step and printing plate step are separated from the printing step, and printing plates to be used are often made by analog exposure. For that reason, the above-described digital data for pages that are used in making printing plates are not employed in the printing management and printing control that are performed in the printing step. However, in recent years, at the request for time-saving for printing and an enhancement in print quality, there has been proposed a technique in which efficient printing and high quality are obtained by using the digital data (platemaking data) of page information in the tone control of printed matter that is performed in the printing step, specifically the presetting control of the ink keys of the printing machine.

For example, Patent Document 1 disclose a technique in which the quantity of ink to be supplied to a printing machine is controlled based on platemaking data by feeding back information detected by an IRGB densitometer. In this way, the tone of printed matter can be controlled immediately after the start of the printing machine, based on the platemaking data. Therefore, the time to initiate tone control is shortened, whereby the operating efficiency can be increased.

Patent Document 1: Japanese Patent Application Laid-Open No. 2004-106523

DISCLOSURE OF THE INVENTION

Subject to Be Solved by the Invention

However, the technique of the Patent Document 1 is a technique for efficiently performing control related to color correction by employing platemaking data and is not an appropriate technique for improving the operating efficiency of the entire printing step and quality.

For instance, usually, national newspapers, have pages common to the whole country (common pages) and pages pressed different contents in each of province or locality (provincial edition pages or local-newspages). And it is necessary to perform a large quantity of printing in a short period of time. Depending upon printing factories, it is necessary to perform printing with several kinds of provincial edition pages, so that there are cases where replacing plates (printing plates for various provinces or localities) put on the printing machine is frequently performed. Such a plate replacing operation is not limited to national newspapers. For example, even in the case of printing inserted bills or the like, printing is performed with a different printing plate for each distribution area to give optimum information (a map of the nearest store, etc.) to the distribution area.

However, the operator performs the plate replacing operation by hand, and selects a desired printing plate from a plurality of kinds of printing plates by viewing the plate, or data sheets (on which codes relating to plate names, pages, and colors are written) attached to the plate. This can easily cause human error such as selecting a wrong printing plate.

In addition, in the case of correcting the tone of a printing machine based on platemaking data, when loading the platemaking data, the operator loads undesired platemaking data by mistake in loading desired data from a plurality of sets of platemaking data for various prefectures, so that the operator must reload the desired data. Thus, there are cases where time loss will occur in the printing step.

With the foregoing problems in view, the object of the present invention is to provide a print preparation method, a print preparation method, a terminal unit for a print system, a program for a print system, and a recording medium for a print system that are capable of performing high-quality printing in a short period of time in a printing machine which uses platemaking data to perform quality control, and that are capable of reducing human error caused by the operator.

Means for Solving the Problems

To attain the above object, as a first generic feature, there is provided a print preparation method using a server in which printing data including a plurality of page data pieces each of which includes platemaking data and related information associated with one of a plurality of pages is stored, and a terminal unit, connected to the server, for acquiring the printing data and sending one or more of the plurality of page data pieces to a controller which controls a printing machine, wherein: the printing data includes a number of selective page data pieces for a particular page, which has a number of alternative versions and which requires a number of printing plates each of which is considered to be a unit, which printing plates are exchanged to print the particular page, among the plurality of pages; and the terminal unit performs a printing job selecting step in which one of the selective page data pieces for the particular page is selected as a pre-printing step, and sends the one selective page data piece selected in the printing job selecting step to a controller.

As preferable feature, the page data may include job information serving as the related information of each of the plurality of pages.

As a second generic feature, here is provided a print preparation system comprising: a server in which printing data including a plurality of page data pieces each of which includes platemaking data and related information associated with one of plurality of pages is stored; and a terminal unit, connected to the server, for acquiring the printing data and sending one or more of plurality of page data pieces to a controller which controls a printing machine, wherein, the printing data includes a number of selective page data pieces for a particular page, which has a number of alternative versions and which requires a number of printing plates each of which is considered to be unit, which printing plates are exchanged to print the particular page, among the plurality of pages, and the terminal unit includes selection means for selecting one of the selective page data pieces for the particular page, and is operable to send the one selective page data piece selected by the selection means to the controller.

As a preferable feature, the page data includes job information serving as the related information of each of the plurality of pages.

As a third generic feature, there is provided a terminal unit used in a print system including a server in which printing data including a plurality of page data pieces each of which includes platemaking data and related information associated with one of a plurality of pages is stored, a printing press, having a number of printing units, for printing, detection means, attached to the printing press, for detecting a state of a sheet underwent printing, a controller for controlling each of the printing units based on the page data pieces and information sent from the detecting means, wherein: the printing data includes a number of selective page data pieces for a particular page, which has a number of alternative versions and which requires a number of printing plates each of which is considered to be a unit, which printing plates are exchanged to print the particular page, among the plurality of pages; and the terminal unit includes selective data displaying means for displaying thereon the selective page data pieces in a pre-printing step, selection means for selecting one of the selective page data pieces displayed on the selective data displaying means, so that the selective data displaying means displays thereon the platemaking data included in the one selective page data piece selected by the selection means, and page data sending means for sending the one selective page data piece selected to the controller.

As a fourth generic feature, there is provided a computer program used for a printing system including a server in which printing data including a plurality of page data pieces each of which includes platemaking data and related information associated with one of a plurality of pages is stored, a printing press, having a number of printing units, for printing, detection means, attached to the printing press, for detecting a state of a sheet underwent printing, a number of controllers, associated one with each of the printing units, each of which controls the associated printing unit based on the page data pieces and information sent from the detecting means, and a terminal units, serving as a memory and am arithmetic operation unit and connected to the server, for acquiring the printing data and sending one or more of the plurality of page data pieces to each of the controllers, wherein the printing data includes a number of selective page data pieces for a particular page, which has a number of alternative versions and which requires a number of printing plates each of which is considered to be a unit, which printing plates are exchanged to print the particular page, among the plurality of pages; and the program instructs a computer serving as the terminal unit functioning the memory and the arithmetic unit to function as selective data displaying means for displaying thereon the selective page data pieces in a pre-printing step, and selection means for selecting one of the selective page data pieces displayed on the selective data displaying means.

As a fifth generic feature, there is provided a recording medium in which the program defined in claim 6 is recorded.

DESCRIPTION OF REFERENCE NUMERALS

Figure 1:
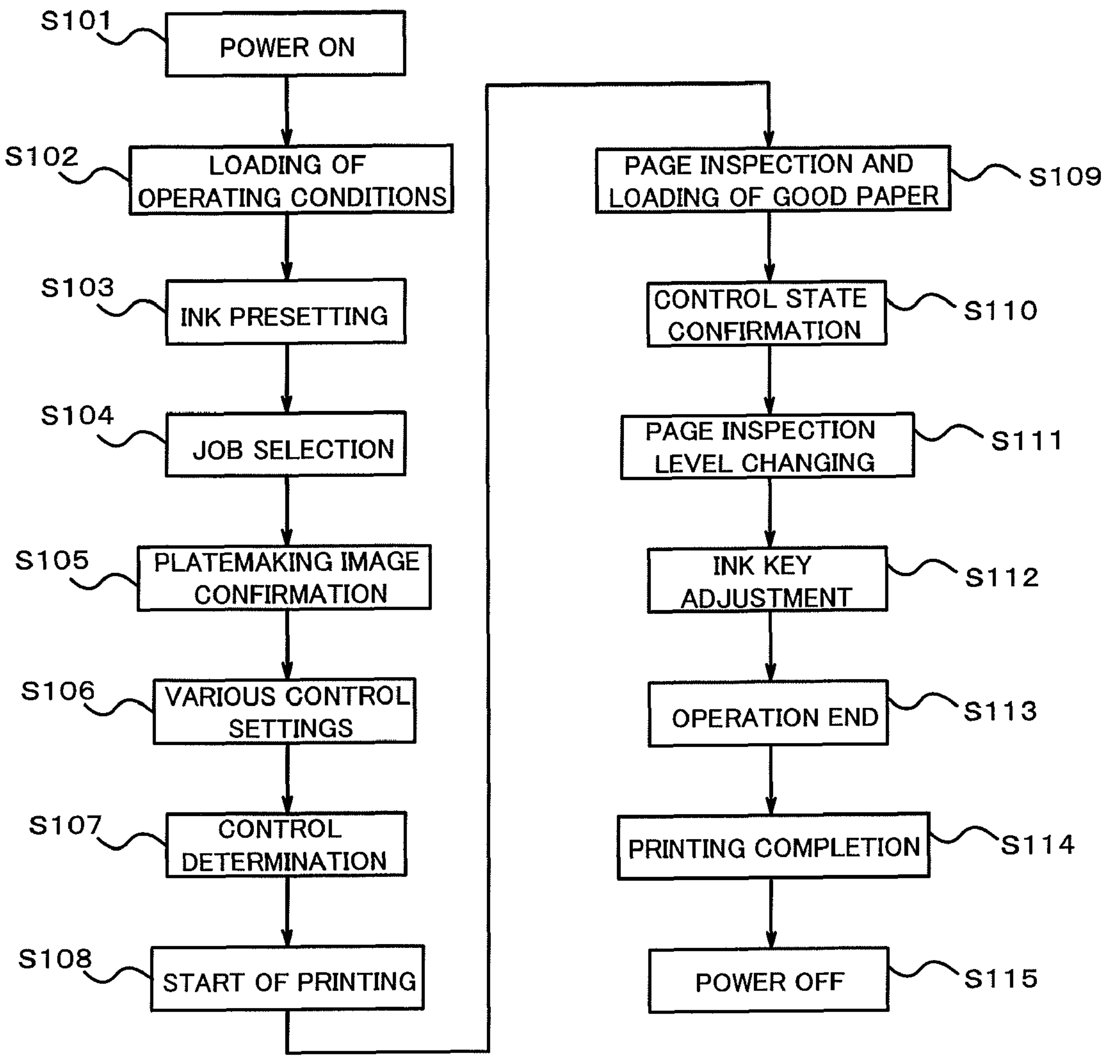
FIG. 1 is a diagram showing a simplified configuration of an offset rotary newspaper printing machine according to an embodiment of the present invention.

1 Line sensor type IRGB densitometer
2*a*, 2*b*, 2*c*, 2*d* Printing unit
3 Blanket cylinder
4 Plate cylinder
5 Ink roller group
6 Ink source roller
7 Ink key
8 Web
10 Arithmetic unit
11 DSP
12 PC
14 Color converting unit
15*a* Smear determining unit
16*a* Dampening-water supply setting unit
15*b* Ink supply calculating unit
16*b* Online controller
17*b* Key opening limiter calculating unit
18 Receiver
20 Controller built in a printing machine
30 Touch panel
30*a* Display unit
41 Conversion section
42 Position shift calculator
43 Position shift corrector
44 Wrong-plate detectors
70 Dampening-water supply unit
74 Water sprayer
50 Head office server
51 Data server (printing factory data server)
52 CTP system
53, 101 Printing machine OT (terminal unit)
54, 102 Newspaper rotary press (printing machine)
103 Printing press
104 Controller
105 Printing unit
106 Sensor (detectors)
150 Storage-arithmetic unit
151 Display unit (Display section)
152 Input device (touch panel)(selectors)

BEST MODE FOR CARRYING OUT THE INVENTION

An embodiment of the present invention will hereinafter be described with reference to the drawings. FIGS. 1 to 19 show a printing preparation method and a print preparation system according to the embodiment of the present invention, and to make understanding easier a printing system employing this printing control method in newspaper printing will be considered, and based on these figures, the printing system will be described.

Figure 2:
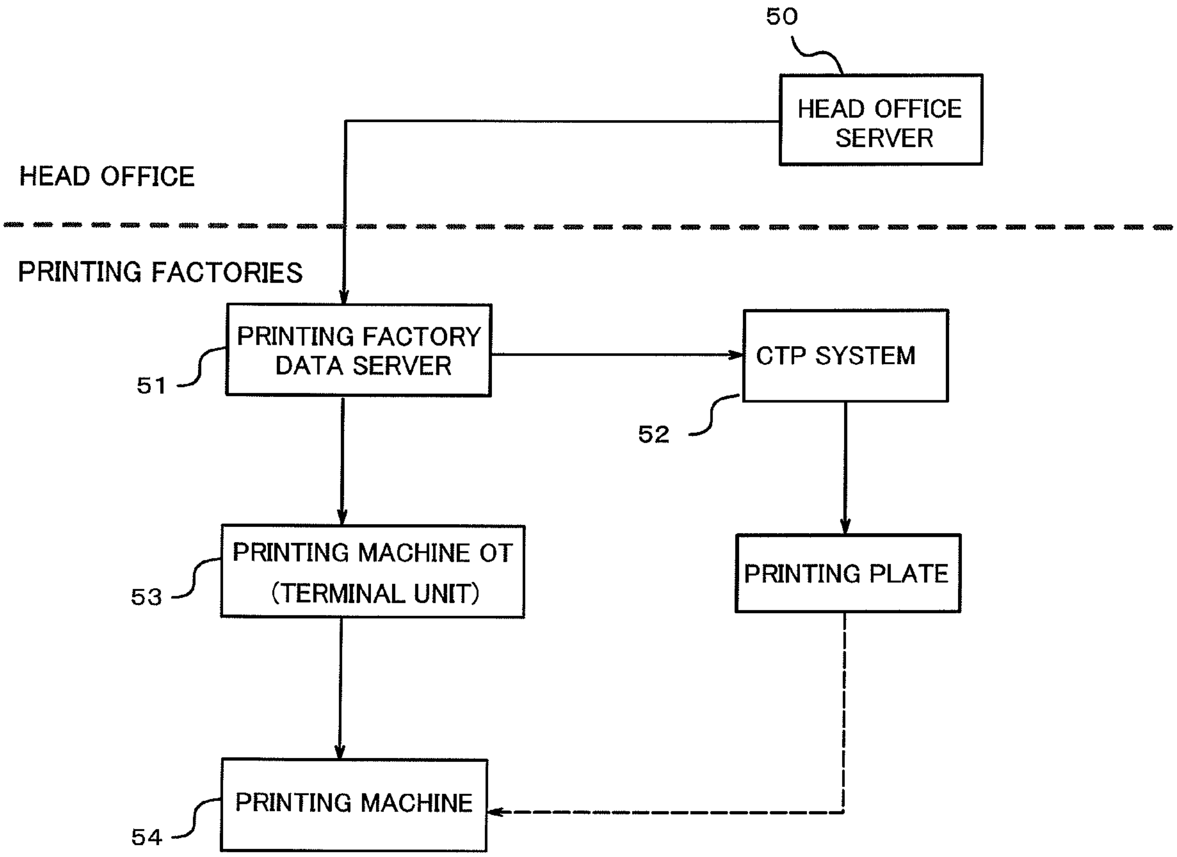
FIG. 2 is a schematic block diagram showing a newspaper printing system according to the embodiment of the present invention.

Referring initially to the configuration of the newspaper printing system according to the present embodiment, as shown in FIG. 2, in an editorial center (that performs editing of compound media which contain not only newspapers but also other media such as Internet media) provided outside the newspaper printing factories (usually in the head office of a newspaper publishing company), editing of newspapers is performed. The result of the editing is sent out as printing data from a head-office server 50 through a communication network to data servers 51 provided in the newspaper printing factories of various places. Note that the printing data contain platemaking data including image data for pages which are employed in platemaking and page-related information that relates to pages. The printing data for each page is called page data.

The page data received by each newspaper printing factory is then stored in the data server 51 of the newspaper printing factory. In the newspaper printing factory, the received page data is transmitted from the data server 51 to a CTP system 52, which performs an RIP process on image data for a page as required (there is no need when it has undergone the RIP process in the head office). In the case of a color page, halftone dots are made for each of the process colors, cyan, magenta, yellow, and black (CMYK). According to the RIP-processed data, a printing plate is made for each printing color.

The printing plates thus made are then put on the corresponding printing cylinders of a printing machine to perform printing, usually by an operator.

Referring in further detail to page data, a page used herein corresponds to a printing plate as one unit, and page data that is transmitted from the head-office server 50 contains image data, made in the unit of a printing plate which is put on the printing machine, and data as page-related information, such as provincial edition information, plate name, printing-unit information, etc.

The "provincial edition information" contained in page data is information indicating which of a plurality of plates for the page data is. Note that when page data is a page common to the whole country, information indicating a common plate is added.

The "printing-unit information" is information indicating which printing cylinder of a plurality of printing presses constituting the printing machine 54 a printing plate corresponding to the page data is put on, and contains information on the number and front or rear of a printing unit that actually prints page data, and other information.

The "plate name" is a name uniquely given to a printing plate. In each printing factory, information on a printing plate and information in order to be printed are added to these page data, and they are stored in the data server 51.

Figure 3:
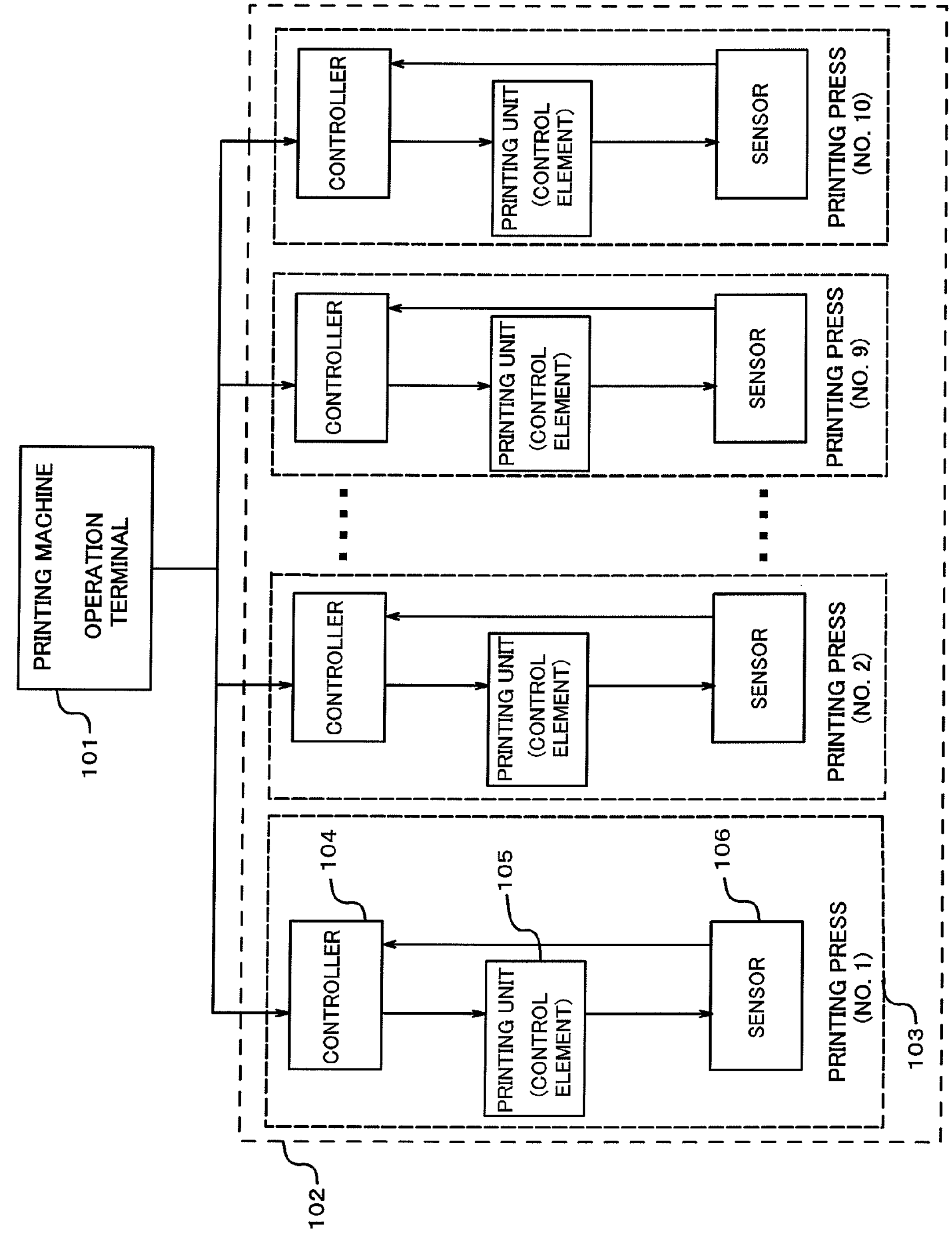
FIG. 3 is a schematic block diagram showing a terminal unit, a printing machine, and printing presses according to the embodiment of the present invention.

Referring now to FIG. 3, a description will be given of the printing machine including a plurality of printing presses, and an operation terminal that controls the printing machine.

As shown in FIG. 3, the newspaper rotary press (printing machine) 102 of the present embodiment is equipped with ten printing presses 103 numbered from one to ten. Each printing press 103 is equipped with a controller 104, printing unit(s) 105 to be controlled by the controller 104, and a sensor 106.

The controller 104 of each printing press 103 is connected with a printing machine operation terminal 101, from which page data (containing image information and page-related information) is fed into the controller 104 corresponding to the "printing-press information" contained in the page data. The controller 104 of the each printing press 103 is adapted to control the printing unit 105 based on the received page data and the measurement information of a web that is input from the sensor 106.

The printing unit 105, in addition to ink transfer units that transfer ink to paper actually (printing cylinders including a plate cylinder and a blanket cylinder), is constituted by an ink supply device for supplying ink to the printing cylinders, a dampener for transferring water to non-printing areas, a simplified plate detector for detecting the mistake of putting a wrong printing plate, and so forth. The controller 104 is adapted to be able to control each of the constituent elements of the printing unit 105 based on page data. The controller 104 and the ink supply device, dampener, simplified plate detector of the printing unit 105 will be described in detail later.

The sensor 106 is, for example, line sensor IRGB densitometers, which are installed over both sides of a web that is printed after it is passed through the printing unit 105 and are disposed to oppose each other via the conveying path of the web. The sensor 106 is adapted to measure density reflected from both sides of the printed sheet and transmit the measurement information to the controller 104.

More specifically, the printing machine operation terminal 101 scans a reference image such as a color chart printed on a web using this sensor 106, measures print characteristic information such as a color development characteristic based on the scanned data, converts the measured color development characteristic into a data structure such as a color development characteristic table, and stores the data structure in predetermined storage section such as a storage-arithmetic unit 150 or data server 51, as print characteristic information. In the print preparation stage, when calculating a target control value such as a supply of ink, by performing a process in which the target control value is set by referring to this color development characteristic table, it becomes possible to realize higher-quality printing.

Figure 4:
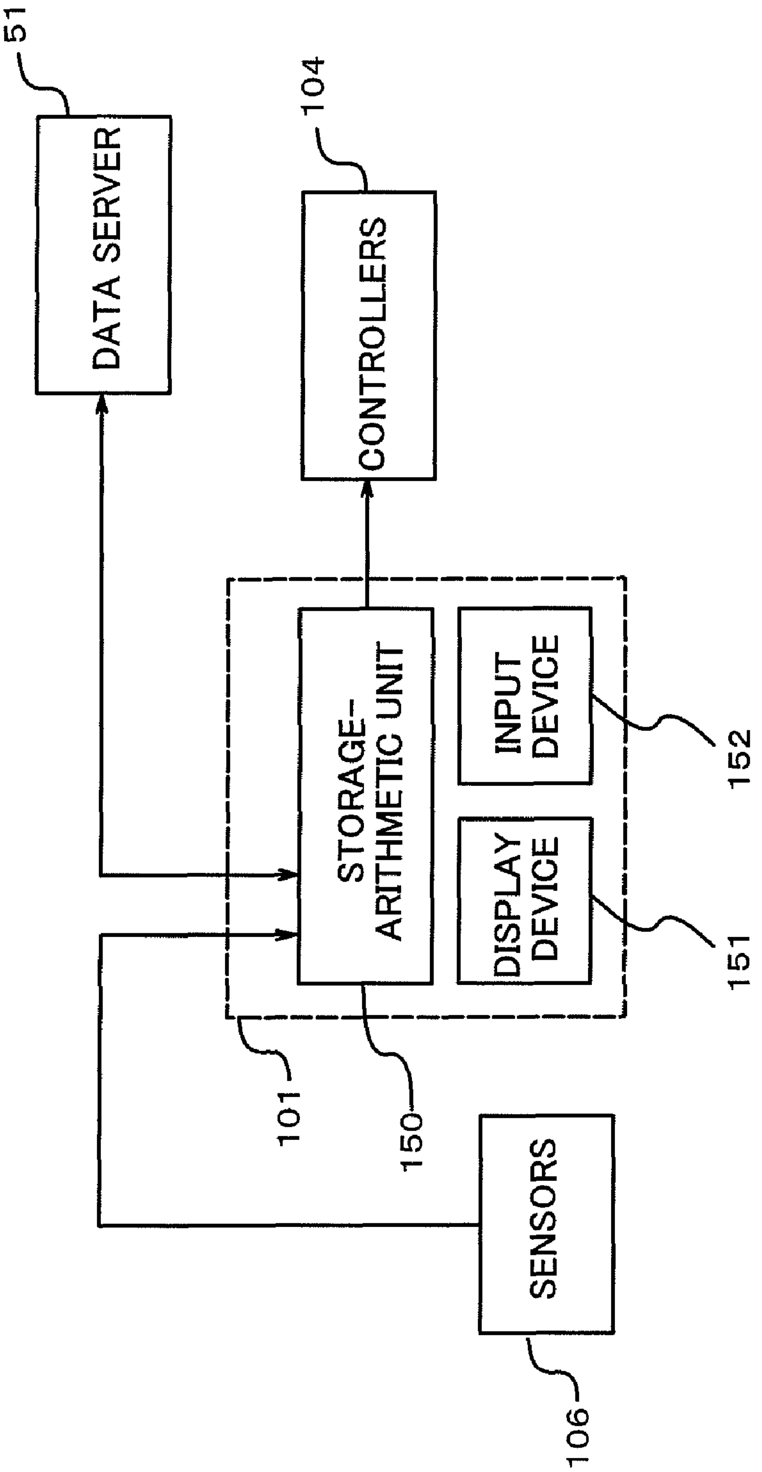
FIG. 4 is a diagram showing a simplified functional configuration of the terminal unit according to the embodiment of the present invention.

Referring in further detail to the printing machine operation terminal 101, as shown in FIG. 4, the printing machine operation terminal 101 is equipped with the storage-arithmetic unit 150, which is constituted by a memory device, a central processing unit (CPU), and so on, a display unit (display section) 151 for displaying the image information contained in page data, the operating condition of each printing unit, index information of data stored in the data server 51, and other information, and an input unit (selectors) 152 for inputting an instruction such as a selection manipulation by an operator. In this embodiment, the display screen of the display unit 151 functions as a touch panel, and the display unit 151 and input device 152 are formed as one body.

As set forth above, the printing machine operation terminal 101 is adapted to receive page data (containing page-related information) from the data server 51 and store the received page data in the storage-arithmetic unit 150. The page data stored in the storage-arithmetic unit 150 are sent out to the controllers 104 of the printing presses 103 and are displayed page by page on the display unit 151 (see FIG. 5). In the case where page data contains a plurality of kinds of provincial edition information, they are displayed on a job selecting screen, and an operator is able to select a desired job to be printed, by touching an area on the touch panel that corresponds to the job.

Figure 5:
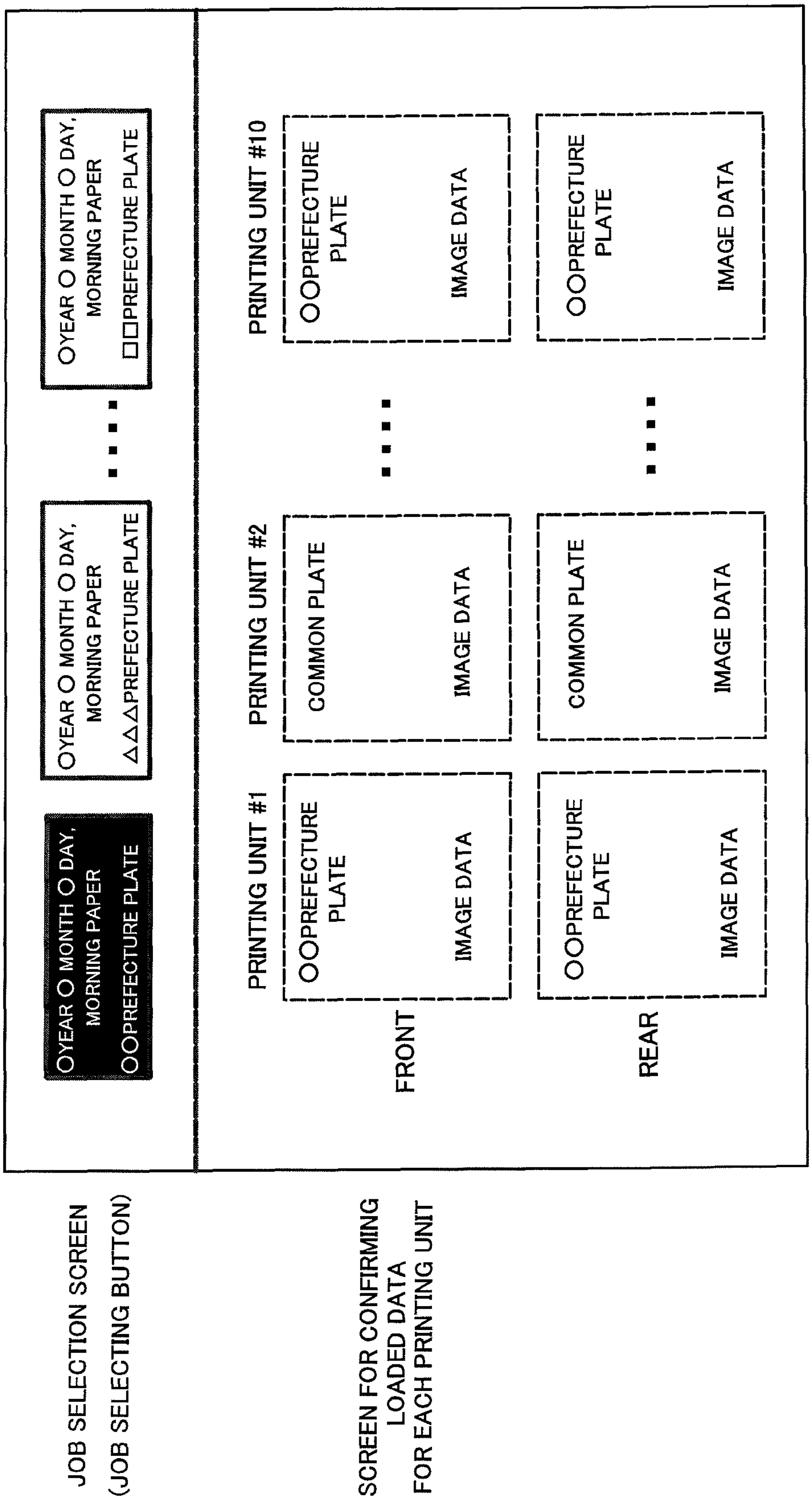
FIG. 5 is a diagram showing an example of image data displayed on the terminal unit according to the embodiment of the present invention.

In the data confirming screen of the display unit, two pieces of information of page data corresponding to the front and rear of each printing unit can be confirmed (see FIG. 5).

The page data for one of a plurality of kinds of provincial edition information has already been sent to the controller 104 of each printing press 103, but when a different job is selected by an operator, page data that contains provincial edition information corresponding to the selected job is retransmitted.

Therefore, if a power supply for the printing machine operation terminal 101 is turned on, it acquires page data stored in the data server 51 and stores the data in the storage-arithmetic unit 150. A plurality of kinds of information (image information, provincial edition information, plate name, printing-unit information, and other pertinent information) that are contained in the page data stored in the storage-arithmetic unit 150 are displayed page by page on the display unit 151. This enables an operator to confirm the received state of page data, image information to be displayed, and other page-related information, so the operator can confirm whether wrong page data has been loaded into the storage-arithmetic unit 150 of the printing machine operation terminal 101.

Figure 6:
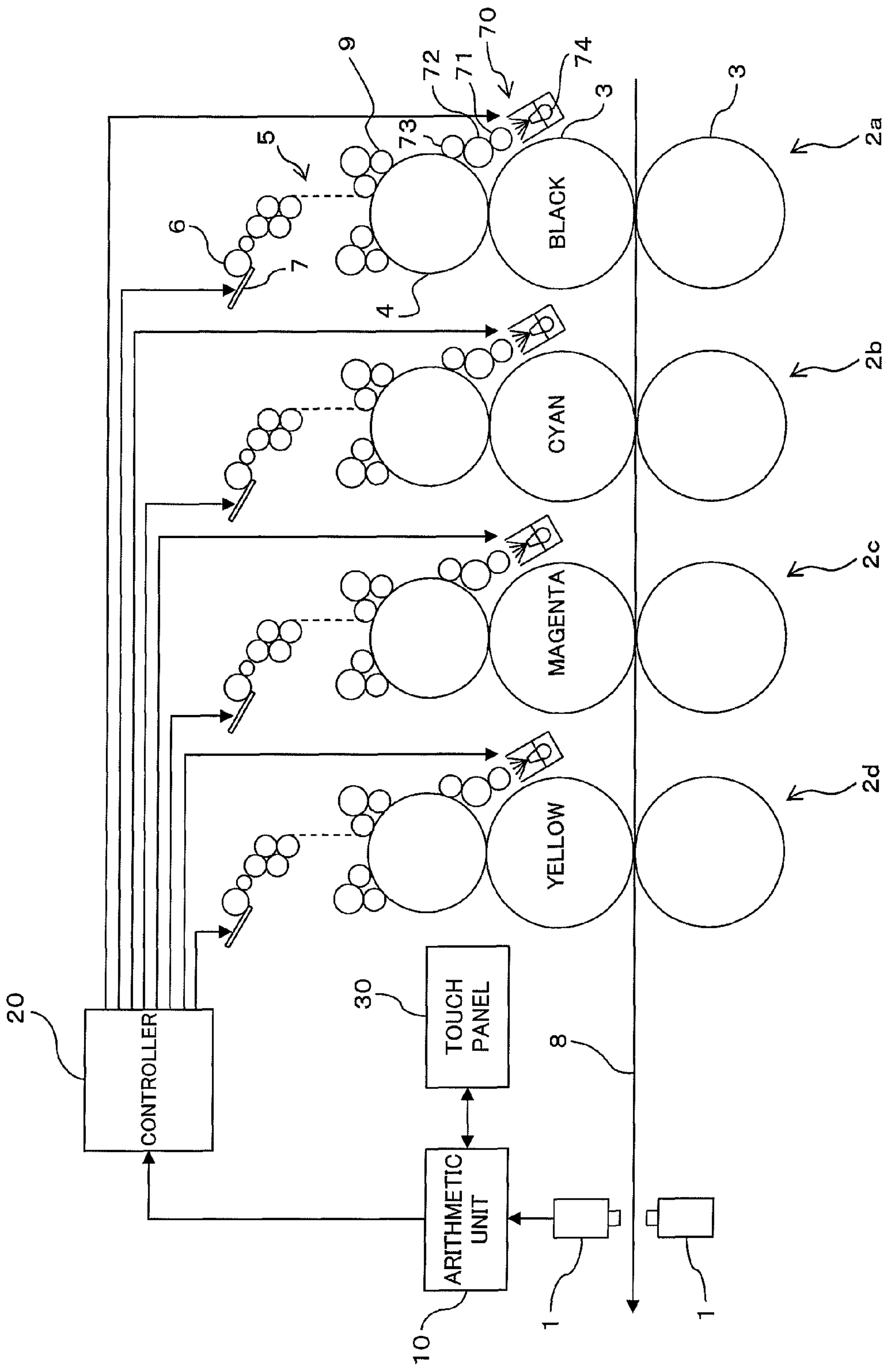
FIG. 6 is a diagram showing a simplified configuration of an offset rotary newspaper printing machine according to the embodiment of the present invention.

FIG. 6 is a diagram showing a simplified configuration of a newspaper rotary press according to the embodiment of the present invention. The offset rotary newspaper printing machine of the present embodiment is a perfecting machine for multicolor printing, and along the conveying path for a web 8, printing units 2_a_, 2_b_, 2_c_, and 2_d_ are installed for the four primary printing colors, black (k), cyan (c), magenta (m), and yellow (y). In the present embodiment, the printing units 2_a_, 2_b_, 2_c_, and 2_d_ are each equipped with an ink key type of ink supply device comprising ink keys 7 and an ink source roller 6. In this type of ink supply device, the supply of ink can be adjusted by the gap between the ink keys 7 and the ink source roller 6 (this gap will hereinafter be referred to as the ink key opening). The ink keys 7 are arranged in the direction of the printing width, so that the supply of ink can be adjusted in units of the width of the ink key 7 (the unit width of ink supply by the ink key 7 will hereinafter be referred to a key zone). The ink adjusted in quantity by the ink keys 7 is kneaded to the desired degree within an ink roller group 5 to form a thin film, and it is then applied to the plate surface of the plate cylinder 4. The ink applied to the plate surface is transferred to the web 8 as an image through a blanket cylinder 3.

Note that although not shown in FIG. 6, the printing press 105 of the present embodiment is adapted to print both sides of the web 8, so the printing units 2_a_, 2_b_, 2_c_, and 2_d_ are each equipped with a pair of blanket cylinders 3 and 3, which are opposed to each other through the conveying path of the web 8. Each blanket cylinder 3 is provided with the above-described plate cylinder 4, simplified plate detector, ink supply device, and dampener 70.

Downstream of the printing unit 2_d_, the offset rotary newspaper printing machine of the present embodiment is equipped with line sensor IRGB densitometers (IRGB densitometers) 1 as detectors. The line sensor IRGB densitometer 1 is an instrument which measures the colors of an image on the web 8 as the reflected density (color mixture halftone screen density) of I (infrared), R (red), G (green), and B (blue) in the direction of the width of the web 8, and is able to measure the reflected density of the entire web 8, or a reflected density at an arbitrary position. Because the offset rotary newspaper printing machine of the present embodiment is a perfecting machine, the line sensor IRGB densitometers 1 are disposed to oppose each other via the conveying path of the web 8 so that they can measure the reflected densities of both sides of the web.

The reflected densities measured by the upper and lower line sensor IRGB densitometers 1 are transmitted to an arithmetic unit 10. The arithmetic unit 10 has a first function of detecting the mistake of putting a wrong printing plate (simplified plate detector); a second function which, when there is a smear of ink, judges what printing ink has caused the ink smear, and based on this judgment, adjusts dampening water that is supplied by the dampener; and a function of calculating control data by which the supply of ink is controlled. In all cases, arithmetic operations are performed based on the reflected densities measured by the line sensor IRGB densitometers 1. In the case of simplified plate detection control, the mistake of putting a wrong printing plate is detected. In the case of dampening-water supply control, the supply of dampening water is adjusted so that an ink smear is eliminated. In the case of ink supply control, the opening of the ink key 7 for causing the color of an image on the web 8 to match with a target printing color is calculated and adjusted.

Since the printing preparation method and the print preparation system according to the embodiment of the present invention are constructed as described above, printing by the printing machine is carried out according to the processing steps shown in FIG. 1.

As shown in the figure, initially, in step S101, if an operator turns on the power supply for the printing machine operation terminal 101 and newspaper rotary press 102, in response to the ON information the printing machine operation terminal 101 loads the above-described page data containing page-related information from the data server 51 in step S102 (operating-condition loading step). The information of the loaded page data is then displayed on the input and display unit of the printing machine operation terminal 101. The page data is fed into the controller 104 of the printing press 103 corresponding to the printing-unit information contained in the page data (operating-condition loading step).

In step S103, initially, each of the controllers 104 adjusts the opening of the ink key 7 based on the image information of the received page data, thereby presetting the supply of ink that is to be supplied to the ink transfer unit of the printing unit (ink presetting step).

In step S104, in the case where a plurality of pieces of provincial edition information are contained in the page data loaded into the printing machine operation terminal 101, the operator selects a job (prefecture plate) that is to be printed, by touching an area on the job screen that corresponds to the provincial edition information to be printed (job selection step). At this stage, when one job of a plurality of jogs has already been selected, and the job is not changed, the operator does not need to do anything.

After receiving the job selection information through the job screen (input section which is manipulated by the operator), the printing machine operation terminal 101 advances to step S105 when there is no instruction to change the job.

When the operator inputs an instruction to change the job that is to be printed, the printing machine operation terminal 101 displays the change of the selected job on the display unit 151, and retransmits page data corresponding to the provincial edition information of the changed job to the controllers 104 of the printing presses 103. Based on the changed page data, steps S102 and S103 are carried out again.

In step S105, the operator confirms the state of arrival of platemaking image data and the platemaking image data from the information displayed on the display unit 151 (image confirmation step). In step S106, the operator performs settings of various control elements as occasion demands (ink supply control, dampening-water supply control, and so on). The image confirmation (simplified plate detection) and dampening-water supply control will be described later. Basically, tone control and dampening-water control are automatically performed based on a feedback reference region and target values given in advance as data. However, there are cases where the operator can perform tone adjustments more accurately by hand without performing automatic control by the ink supply controller. In such a case, the operator sets ink supply control to manual control.

In step S107, if the settings from steps S101 to S106 and confirmation of page data are all completed, the operator issues a control decision instruction by the input device 152 of the printing machine operation terminal 101. After receiving the decision instruction of the operator through the input device 152, the printing machine operation terminal 101 performs a process of calculating and setting printing-related target control values, based on the decided control conditions and preferably by referring to the previously described color development table.

In step S107, if the control decision instruction is issued, the printing machine operation terminal 101 initiates printing in step S108, based on the previously calculated ink key opening and on control target values such as the number of rotations of the ink roller.

Figure 7:
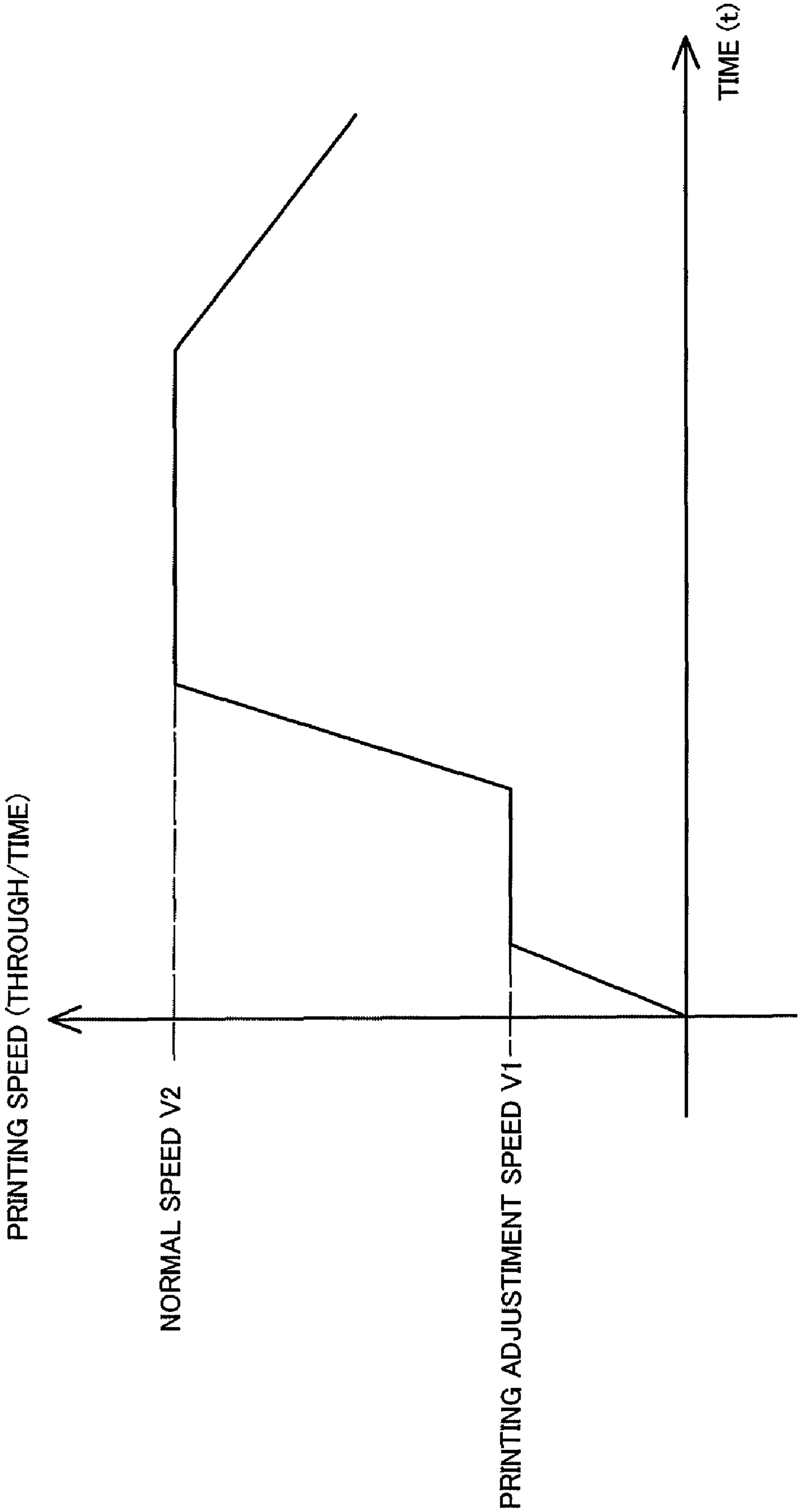
FIG. 7 is a graph showing variations in the printing speed (operating speed) of the offset rotary newspaper printing machine according to the embodiment of the present invention.

In step S109, as shown in FIG. 7, starting control is performed so that printing is performed at a low speed as a printing adjustment speed (low-speed printing step), and based on the page data transmitted to the controller of each printing unit and information measured by the sensor 106, a printing defect inspection process (hereinafter referred to simply as a defect inspection process or page inspection) is performed.

Prior to the page inspection, loading of good paper (reference image) data is performed as a page inspection reference. That is, the operator visually judges whether printed paper is good, and executes an operation of loading a reference image at that point by depressing a good paper button or the like. In many cases, printed paper is usually determined to be good before density control and dampening control become stable.

Because of this, the printing machine operation terminal 101 detects as an execution instruction that the good paper button provided on the input device 152 such as a touch panel has been selected and operated, and according to the detection performs the process of loading a reference image. Thereafter, as the defect inspection process, this reference image and information measured during printing by the sensor are compared in image processing. When there is a difference between the two (when there is an area greater than a predetermined inspection threshold value), it is judged that a defect, such as an ink omission, a variation in density, and an oil blotch, has occurred on a printed sheet. When the difference is greater than a predetermined value, an audible or visible warning of the occurrence of a defect is issued. That is, in the defect inspection process, a certain value of the reference image (for example, a density value of a certain color) is taken to be 100%. When a printed image is less than n % of the value of the reference image, it is determined to be a good product. When it is ±n % or greater, it is determined to be a defective product. In this case, the inspection threshold value is 100±n %.

In step S110, the printing machine operation terminal 101 displays predetermined screen information on the display device 151 to cause the operator to confirm various control states.

After confirming the control states, the printing machine operation terminal 101 changes (or adjusts) the printing speed and page inspection level. That is, in the low-speed printing step, print density is unstable until the printing speed reaches normal speed from the start of printing, so if the inspection level of the page inspection is not low, a normal page will be misjudged to be defective at the time of normal printing in which the print density is stable. For that reason, by increasing the threshold value which is a reference for judging the above-described difference (i.e., by increasing the value of n), the inspection level is made low. If the printing speed reaches production speed, the print density becomes stable. Therefore, the threshold value is reduced (i.e., the value of n is reduced) so that strict (high-level) inspection can be performed. Based on this knowledge, the adjustment process is performed. This makes it possible to detect a defect properly at the time of normal printing, while preventing normal control from being determined to be abnormal at the time of low-speed printing by the main cause of the print density being unstable.

In step S111, the printing machine operation terminal 101 inspects the difference between the reference image and the measurement information by the comparison result obtained after the good paper button has been depressed in step S109. When the difference is smaller than the predetermined value, the printing machine operation terminal 101 determines that controls, such as tone adjustment and dampening-water adjustment controls, are stable, and raises the printing speed to the normal production speed (see FIG. 7). At the same time, the printing machine operation terminal 101 changes the threshold value in the print defect inspection, and changes the difference ratio for judging defects in the comparison result of the reference image and the measurement information to a lower threshold value so that the reference for defect judgment in the normal printing step is stricter than the reference for defect judgment in the low-speed printing step. When a difference ratio that is greater than the lower threshold value thus changed is detected, an audible or visible warning of the occurrence of a defect is issued.

In step S112, when it is necessary to change the tone of the web, the printing machine operation terminal 101 acquires information on the adjustment opening of the ink key that is intended by the operator through the input device 152, and issues an instruction for completing adjustments. After the opening of the ink key has been adjusted, feedback control thereafter is performed based on the measurement information from the sensor 106 (IRGB densitometers 1) at the time of the adjustment completion. In the feedback control, as previously described, it is preferable to correct the target control values by referring to the color development table.

In step S113, if the printing of a selected job (one provincial edition page) is completed, in step S114 the operator issues an instruction for completing the printing by the input device 152 to execute the completion of the printing. After the completion of the printing has been executed, the power supply for the printing machine operation terminal 101 and newspaper rotary press 102 is turned off to conclude the printing step.

[Simplified Plate Detection]

Figure 8:
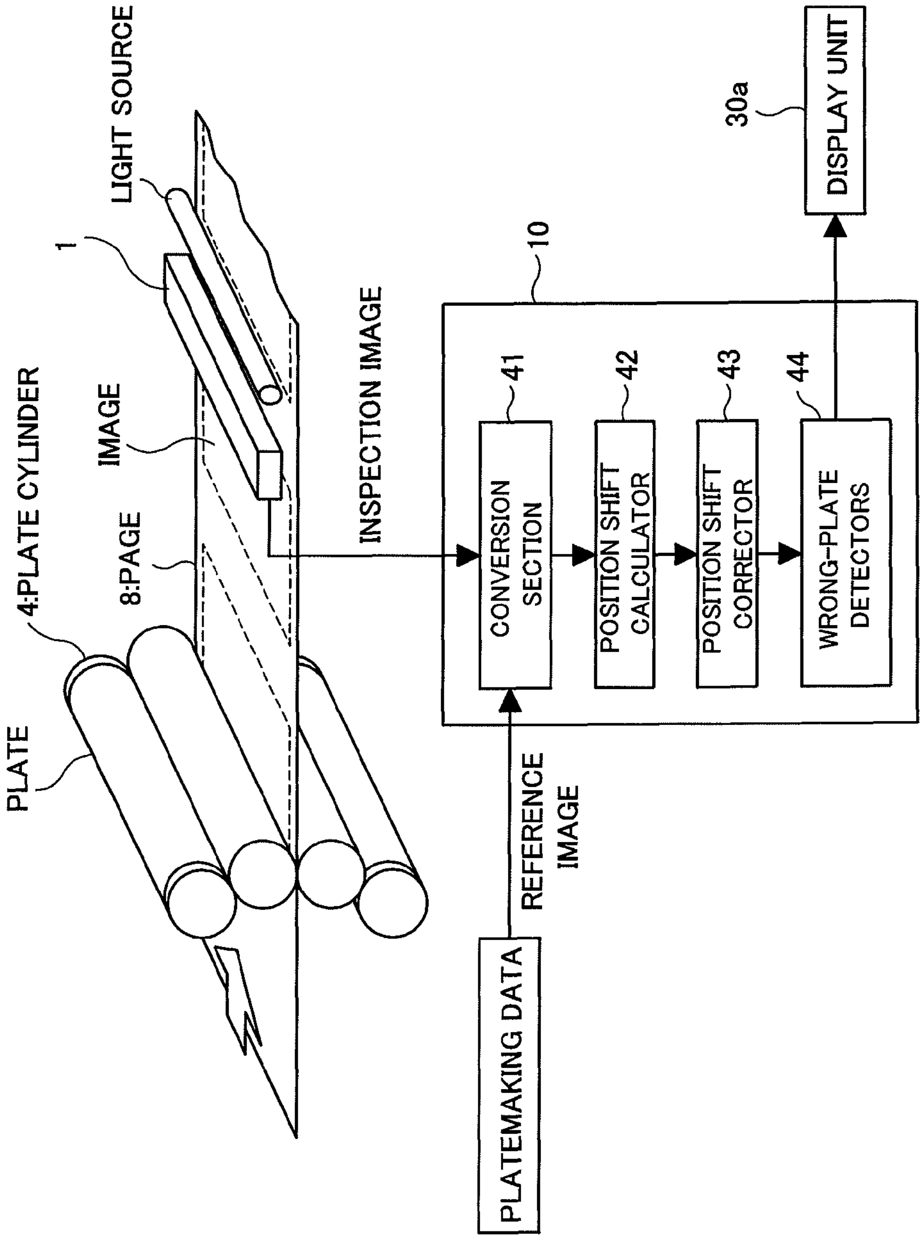
FIG. 8 is a configuration diagram (part-block diagram) schematically showing a simplified plate detector according to the embodiment of the present invention.

The simplified plate detection control part of the arithmetic unit 10, as shown in FIG. 8, is constituted by functions that are equivalent to conversion section 41, position shift calculator 42, position shift corrector 43, and wrong-plate detectors 44.

The conversion section 41 is adapted to convert an inspection image obtained by a line sensor camera 1 into image data, using a variable density level value (e.g., a luminance value) f(x, y) in which x is a position on the printing surface in the width direction of a sheet 8 and y is a position on the printing surface in the travel direction of the sheet 8.

The conversion section 41 is adapted to receive the image of the platemaking data as a reference image and calculate a printing-area ratio for each pixel of the sensor from this reference image (for example, a ratio of the number of 1 dot to the total number of dots in one pixel when a dot that is printed is represented as a 1 dot and a dot that is not printed is represented as a 0 dot).

The conversion section 41 is also adapted to convert the CMYK printing area ratio of the reference image into a density value by a previously prepared density conversion look-up table (also referred to as a CMYK printing area ratio-density value look-up table (LUT)), and convert the density value into an RGBIr luminance value using the following Eq. 1.

[Eq. 1]

$$\text{Density value}=\log_{10}(G/g) \tag{1}$$

in which G is a reference brightness (luminance value of a nonprinting area) and g is a luminance value.

Thus, the conversion section 41 is adapted to convert the reference image $f_{base}$ (x, y) stored as the color information of CMYK into the same form as the inspection image f(x, y) obtained by the line sensor camera 3, that is, an RGBIr luminance value.

The position shift calculator 42 is adapted to calculate the shift in position (Δx, Δy) between the reference image $f_{base}$ (x, y) converted into a luminance value by the conversion section 41 and the inspection image f (x, y), employing a normalized correlation method.

Figure 9:
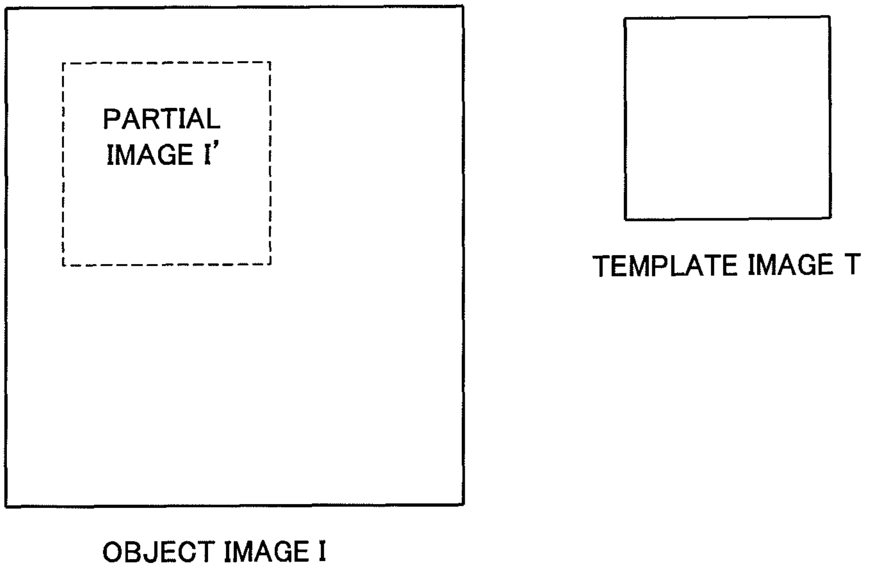
FIG. 9 is a diagram for explaining a normalized correlation method used in simplified plate detection according to the embodiment of the present invention.

In the normalized correlation method, as shown in FIG. 9, a two-dimensional image is prepared as a template image T, a partial image I' of the same size as the template image T is cut out from an object image I, and these two-dimensional images T and I' are taken to be one-dimensional vectors, respectively. The correlation value between the two images is calculated by the following Eq. (2).

[Eq. 2]

$$\text{Correlation value } C = \frac{\vec{I}' \cdot \vec{T}}{|\vec{I}'|\cdot|\vec{T}|} \quad (0 \leqq C \leqq 1) \tag{2}$$

From Eq. 2, the correlation value C is calculated for the entire object image by shifting the partial image I' one pixel at a time. A point at which the correlation value C is a maximum is assumed to be a point at which the template image T exists. In this way, the positional relationship between the template image T and the object image I, that is, the shift in position can be calculated.

The position shift calculator 42 is adapted to calculate the shift in position (Δx, Δy) between the reference image $f_{base}$(x, y) and the inspection image f(x, y), by extracting the central portion (e.g., 140 horizontal pixels×220 vertical pixels) of the reference image (e.g., 160 horizontal pixels×240 vertical pixels) as the template image T and performing the calculation of the normalized correlation method described above.

When the maximum correlation value C is smaller than a predetermined reference correlation value, the wrong-plate detectors 44 that is to be described later is adapted to detect that a printing plate 5 put on a plate cylinder 4 is entirely different from the printing plate that should be put on the plate cylinder 4

The position shift corrector 43 is adapted to correct the shift in position of the inspection image f (x, y) based on the shift in position (Δx, Δy) calculated by the position shift calculator 42.

A specific description will now be given of the position shift correction. To give the description in stages, assume a one-dimensional image. That is, the description will be given with the reference image as $f_{base}(x)$ and the inspection image as f(x).

Figure 10:
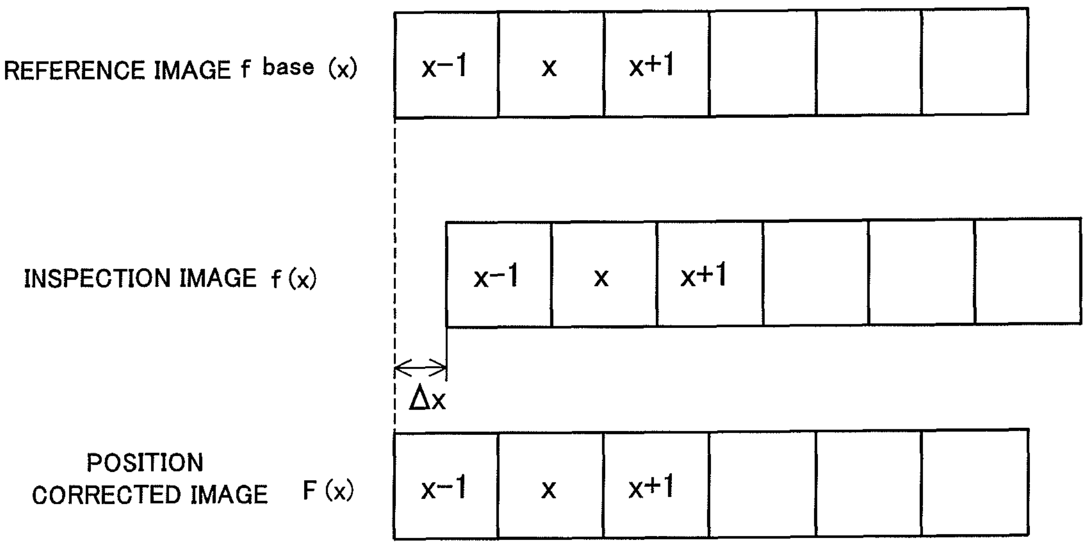
FIG. 10 is a diagram for explaining the processing that is performed by position shift detectors used in the simplified plate detection according to the embodiment of the present invention.

As shown in FIG. 10, when an inspection object is shifted from the reference image $f_{base}(x)$ by Δx in the positive direction of an x axis, the obtained inspection image f(x) is expressed by the following Eq. 3, if there is no print defect (an ink blotch or color omission).

[Eq. 3]

$$f(x)=\Delta x f_{base}(x-1)+(1-\Delta x)f_{base}(x) \tag{3}$$

After the shift in position of the inspection image f(x) has been corrected, a corrected image F(x) is expressed by the following Eq. 4.

[Eq. 4]

$$F(x)=\Delta x f(x+1)+(1-\Delta x)f(x) \tag{4}$$

From Eq. 4, the luminance value F(x) of the corrected image can be obtained by correcting the shift in position of the inspection image f(x).

Because there are cases where the inspection image obtained by the line sensor camera 3 is on the whole brighter or darker than the reference image, in order to eliminate this difference in level, the position shift corrector 43 is adapted to perform the scaling of the luminance value level between the reference image and the corrected image.

In the scaling, the maximum value $Max_{std}$ and minimum value $Min_{std}$ of the luminance value of the reference image $f_{base}(x)$ are first calculated (step 1). The maximum value Max and minimum value Min of the corrected image F(x) are then calculated (step 2). And by the following Eq. 5, the illuminance values of all pixels of the corrected image F(x) are converted. In Eq. 5, v represents the luminance value of each pixel of the corrected image.

[Eq. 5]

$$(v-Min)\times\{(Max_{std}-Min_{std})/(Max-Min)\}+Min_{std} \tag{5}$$

According to the steps described above, the scaling of the luminance value level between the reference image $f_{base}(x)$ and the corrected image F(x) is performed.

The wrong-plate detectors 44 is adapted to subtract the second derivative of the reference image $f_{base}(x)$ corresponding to the shift in position of the reference image $f_{base}(x)$ from the difference between the corrected image F(x) and the reference image $f_{base}(x)$, using the following Eq. 6.

[Eq. 6]

$$S=|f_{base}(x)-F(x)-|\text{second derivative of } f_{base}(x)|| \tag{6}$$

Next, the wrong-plate detectors 44 compares the luminance value difference (variable level difference) S of the inspection image f(x) obtained by Eq. (6) with a predetermined reference level difference.

The wrong-plate detectors 44 is adapted to calculate the number N of pixels in which S is greater than the reference level difference, and calculate a ratio (area) M of the number N to the total number N0 of pixels. When the ratio M is smaller than a predetermined reference ratio, the wrong-plate detectors 44 determines that the plate 5 put on the plate cylinder 6 is a correct plate. When the ratio M is greater than the predetermined reference ratio, the wrong-plate detectors 44 determines the plate 5 put on the plate cylinder 6 to be a wrong plate.

The above-described Eq. 6 is obtained by performing the following calculations. Initially, substituting Eq. 3 into Eq. 4 gives the following Eq. 7.

[Eq. 7]

$$F(x)=\Delta x(1-\Delta x)\{f_{base}(x-1)-2f_{base}(x)+f_{base}(x+1)\}+f_{base}(x) \tag{7}$$

By letting Δx(1−x)=k, the following Eq. 8 is obtained.

[Eq. 8]

$$f_{base}(x)-F(x)=k\{-f_{base}(x-1)+2f_{base}(x)-f_{base}(x+1)\} \tag{8}$$

When 0≦Δx≦1, k is 0≦k≦0.25.

From the braces on the right-hand side of Eq. 8, the following Eq. 9 is obtained.

[Eq. 9]

$$-[\{f_{base}(x+1)-f_{base}(x)\}-\{f_{base}(x)-f_{base}(x-1)\}] \tag{9}$$

Eq. 9 represents the subtraction of the subtraction of the reference image $f_{base}(x)$, that is, the second derivative of the reference image $f_{base}(x)$.

If an image is expressed in two dimensions, that is, if the reference image is represented by $f_{base}(x, y)$ and the inspection image by f(x, y), the following Eq. 10 is obtained in the same manner as the aforementioned.

[Eq. 10]

$$\begin{aligned} f_{base}(x, y) - F(x, y) = {} & k_x\{-f_{base}(x-1, y) + 2f_{base}(x, y) - f_{base}(x+1, y)\} + \\ & k_y\{-f_{base}(x, y-1) + 2f_{base}(x, y) - f_{base}(x, y+1)\} + \\ & k_x k_y\{-f_{base}(x-1, y-1) - f_{base}(x+1, y-1) + \\ & 4f_{base}(x, y) - f_{base}(x-1, y+1) - f_{base}(x+1, y+1)\} \end{aligned} \tag{10}$$

In Eq. 10, kx=Δx(1−Δx) (when 0≦Δx≦1, 0≦kx≦0.25) and ky=Δy(1−Δy) (when 0≦Δy≦1, 0≦ky≦0.25).

Note that the first term on the right-hand side of Eq. 10 is the second derivative in the x-axis direction of the reference image $f_{base}(x, y)$, the second term on the right-hand side is the second derivative in the y-axis direction of the reference image $f_{base}(x, y)$, and the third term on the right-hand side is the second derivative in the oblique direction of the reference image $f_{base}(x, y)$.

As set forth above, even if the corrected image F(x, y) is subtracted from the reference image $f_{base}(x, y)$, the result has a certain value, not zero. This value is found to be a value equal to the second derivative of the reference image $f_{base}(x, y)$.

More particularly, the present detector is able to correct a shift in position more accurately by further subtracting the second derivative of the reference image $f_{base}(x, y)$ from the value of the subtraction of the corrected image F(x, y) from the reference image $f_{base}(x, y)$, thereby detecting a finer difference between the reference image $f_{base}(x, y)$ and the inspection image f(x, y). This makes it possible to more accurately detect whether the mistake of putting a wrong plate has occurred or not.

In the present detector, when the mistake of putting a wrong plate is detected by the wrong-plate detectors 44, the occurrence of the mistake of putting a wrong plate is displayed on the display 10. This enables the operator to easily find whether the plate 5 is a wrong plate or not, through the display unit 10.

[Dampening-Water Supply Control]

Figure 11:
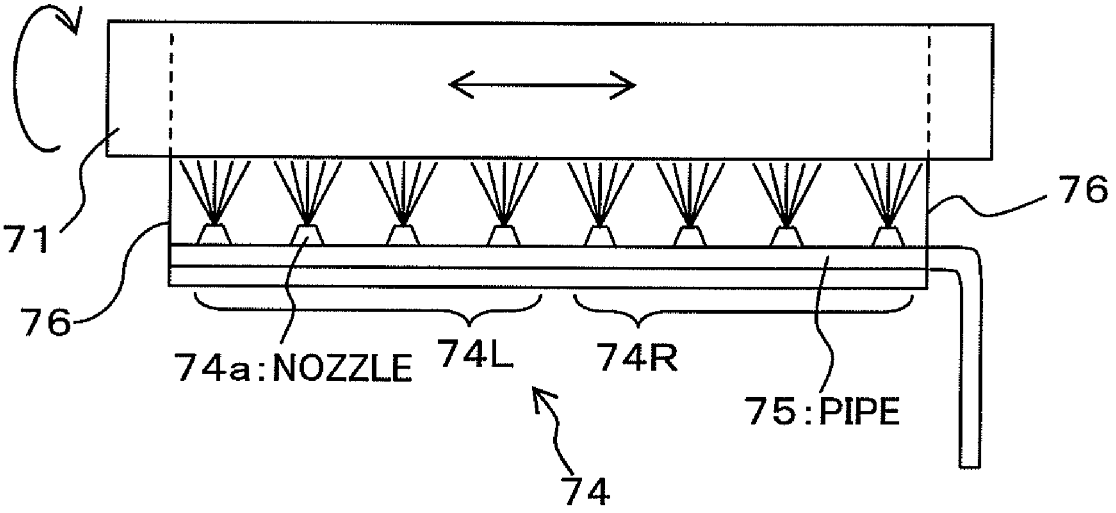
FIG. 11 is a schematic diagram showing a dampening-water supply adjusting unit according to the embodiment of the present invention.
Figure 12:
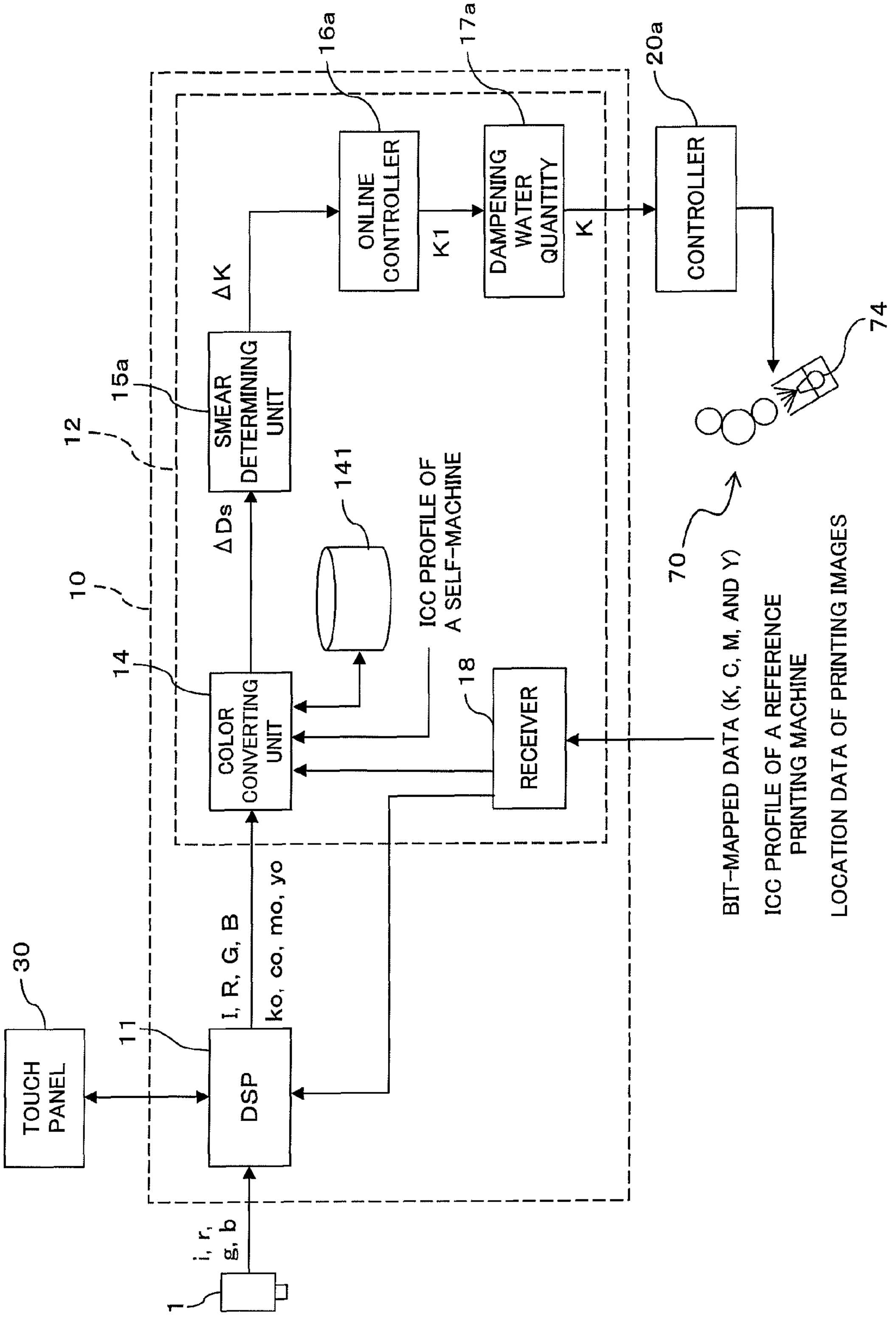
FIG. 12 is a functional block diagram in which attention is directed to dampening-water supply control that is performed by an arithmetic unit according to the embodiment of the present invention.

The dampener 70, as shown in FIGS. 6, 11, and 12, is equipped with a main water roller 71, an intermediate water roller 72, a water transfer roller 73, and a water sprayer 74. The dampener 70 is adapted to spray water on the main water roller 71 from the nozzles 74*a* of the waver sprayer 74 so that water can be supplied through the intermediate water roller 72 and water transfer roller 73 to the plate cylinder (printing cylinder) 4. The nozzles 74*a* of the water sprayer 74 are installed in the axial direction of the main water roller 71 to a pipe 75, which extends in the axial direction of the main water roller 71. The amount of water that is sprayed by the nozzles 74 can be controlled individually or as groups of adjacent nozzles. Therefore, the water supply Qw can be adjusted for each of the areas divided in the axial direction of the plate cylinder 4. Covers 76 are provided outside the axially opposite end nozzles 74*a* so that water is not spayed outside the dampener.

As the simplest example, the nozzles 74 is divided into two groups, and the nozzles 74*a* of the left group 74L and the nozzles 74*a* of the right group 74R can be separately controlled. Therefore, the water supply Qw to be sprayed can be adjusted for each of the two groups. More specifically, the water supply Qw is controlled as the amount of water that is sprayed from the nozzles per unit time.

Now, reference will be made to FIG. 12, which is a diagram showing a simplified configuration of an image tone controller of the offset rotary newspaper printing machine according to the present embodiment, and is a functional block diagram in which attention is directed to the control function of the arithmetic unit 10 for adjusting the amount of dampening water that is supplied.

The arithmetic unit 10 is constituted by a digital signal process (DSP) 11 and a personal computer (PC) 12, which are installed away from the printing machine. The PC 12 functions as a color converting unit 14, a smear determining unit 15*a*, and a dampening-water quantity setting unit 16*a*. The input side of the arithmetic unit 10 is connected with the line sensor IRGB densitometer 1, while the output side is connected to a built-in controller 20 of the printing machine. The controller 20 functions as dampening-water supply adjustment section that adjusts the dampening-water supply Qw for each of a plurality of areas divided in the axial direction of the plate cylinder 4, and is able to adjust operation of the water sprayer 74 of the dampener 70. The arithmetic unit 10 is also connected with a touch panel (display device) 30, on which the printing surface of the web 8 photographed with line sensor IRGB densitometer 1 is displayed so that an area on the printing surface can be selected by a finger.

Figure 13:
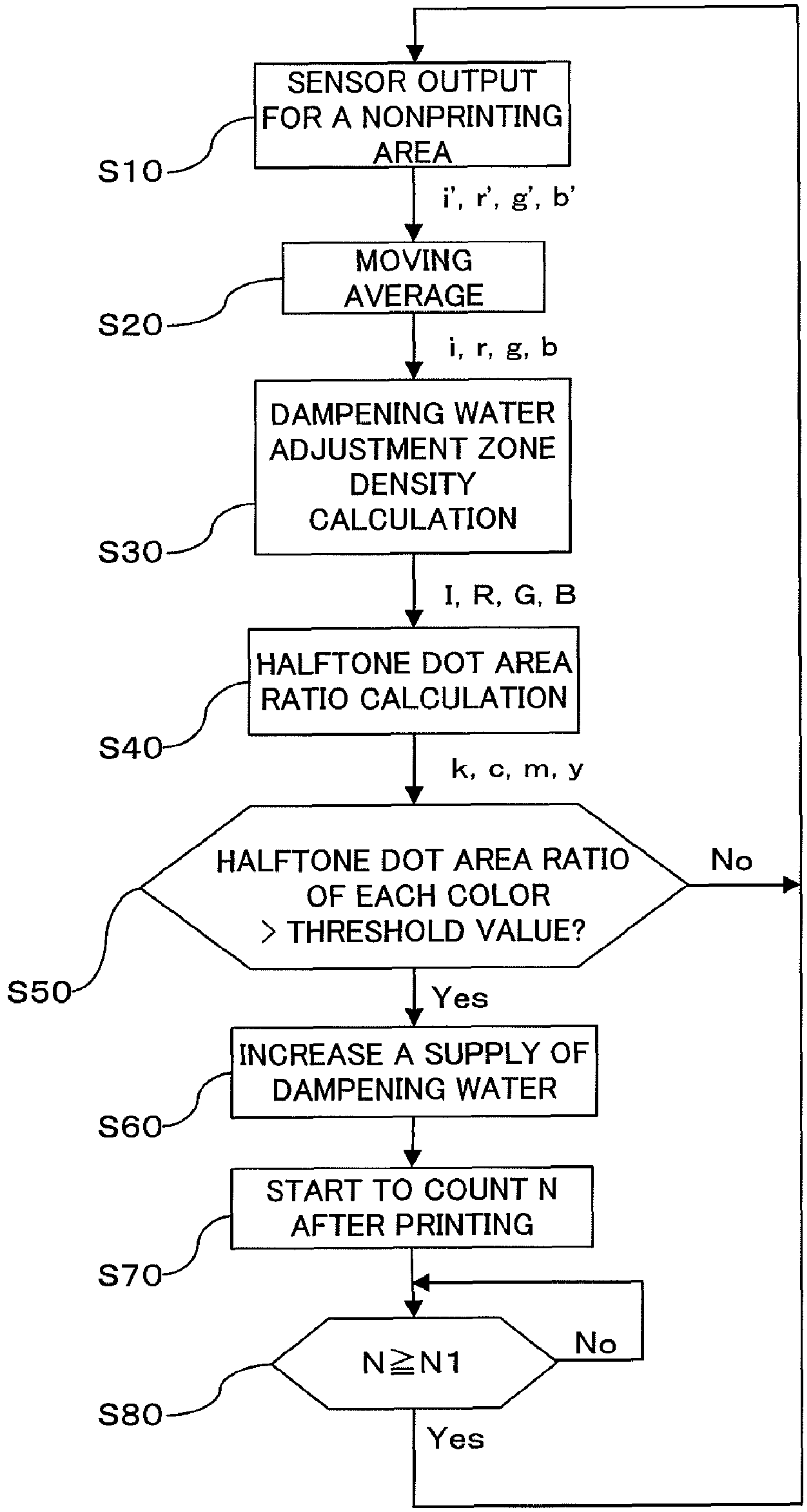
FIG. 13 is a flowchart showing the processing flow of ink smear detection and dampening-water supply control according to the embodiment of the present invention.
Figure 14:
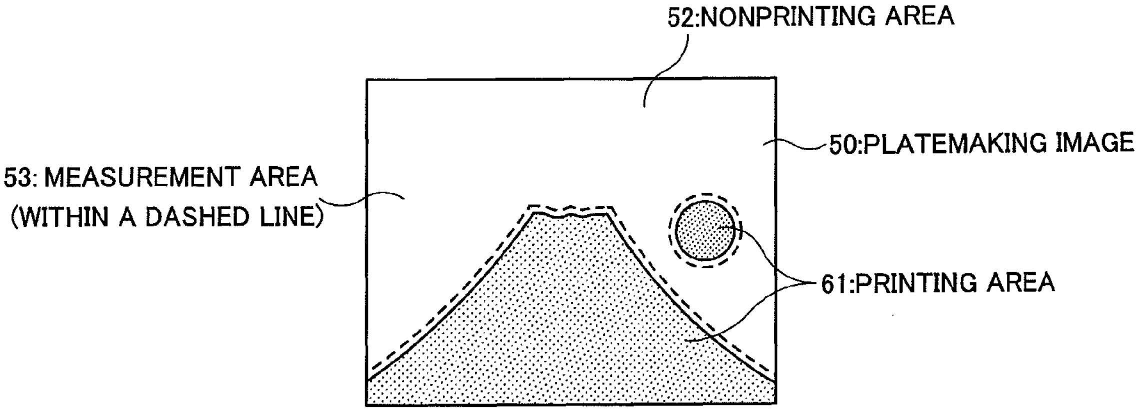
FIG. 14 is a schematic diagram of a platemaking image used to explain the detection of an ink smear according to the embodiment of the present invention.

FIG. 13 is a diagram showing a processing flow chart for the determination of an ink smear by the arithmetic unit 10 and adjustment of dampening-water supply to be performed based on this determination. The color control by the arithmetic unit 10 will hereinafter be described with reference to FIG. 13.

During printing, step S10 and subsequent steps shown in FIG. 13 are repeatedly carried out. In step S10, the line sensor IRGB densitometer 1 measures reflected light quantities i', r', g', and b' for each of all pixels of the whole surface of the web 8. The reflected light quantities i', r', g', and b' of the pixels measured in the line sensor IRGB densitometer 1 are input to the digital signal processor 11.

In step S20, the digital signal processor 20 calculates the reflected light quantities i, r, g, and b of the pixels from which noise components have been removed, by performing the moving average process on the reflected light quantities i', r', g', and b' of the pixels in units of a predetermined number of printings.

In step S30, an object is specified to the nonprinting area of the total surface that is printed, and the reflected light quantities i, r, g, and b are processed for each pixel of a dampening-water adjusting zone to calculate color mixture halftone screen densities (actual color mixture halftone screen densities) I, R, G, and B with the reflected light quantity of a nonprinting area as a reference. For the color mixture halftone screen densities (actual color mixture halftone screen densities) I, R, G, and B, for example, if the reflected light quantity of infrared light of a nonprinting area is represented by ip and the average reflected light quantity of infrared light within the dampening-water adjusting zone is represented by ik, the actual color mixture halftone screen density I of infrared light is calculated as $I=\log_{10}(ip/ik)$.

The reason why an object is specified to a nonprinting area is that in a printing area, it is difficult to distinguish a smear from a printed image. That is, in the nonprinting area, if there is no smear the actual color mixture halftone screen density is zero, but if there is a smear the actual color mixture halftone screen density is a positive value. Thus, the presence or absence of a smear can be determined from the value of the actual color mixture halftone screen density.

Note that the location of the nonprinting area of the printing paper can be recognized from platemaking data. In the present embodiment, the digital signal processor 11 specifies the location of the nonprinting area of the printing paper from platemaking data and automatically sets that area as a calculation area (a measurement area). When an OK sheet is obtained, the setting of the nonprinting area can be manually performed based on an image on the OK sheet.

In a nonprinting area adjacent to a printing area, for example, when the area detecting position is shifted due to the high-speed conveyance of the printing paper, there is a possibility that instead of detecting a nonprinting area, a printing area will be detected. For that reason, in the digital signal processor 11, as shown by a dotted line in FIG. 14, an area of the nonprinting area 52 of a platemaking image 50 which is close to printing areas 51 within a predetermined distance is excluded and a measurement area 53 in which the color mixture halftone screen densities (actual color mixture halftone screen densities) I, R, G, and B are measured is set. Thus, the digital signal processor 11 is adapted to measure the actual color mixture halftone screen density of the measurement area 53.

The actual color mixture halftone screen densities I, R, G, and B for each dampening-water adjusting zone of the nonprinting area thus measured in the digital signal processor 11 are input to the color converting unit 14 of the PC 12. The color converting unit 14 performs the process in step S40. In step S40, the halftone dot area ratios of the printing colors corresponding to the actual color mixture halftone screen densities I, R, G, and B measured in step S30 are calculated. In this calculation, a database 141 is employed, and based on the corresponding relationship stored on the database 141, the halftone dot area ratios of the printing colors corresponding to the actual color mixture halftone screen densities I, R, G, and B are calculated as k, c, m, and y.

More specifically, the database 141 of the present embodiment stores the well-known Neugebauer equation that prescribes the corresponding relationship between the halftone dot area ratios and the color mixture halftone screen densities of the printing colors.

In the present embodiment, before performing actual printing with a printing machine (actual machine), a color chart, which consists of solid density values k, c, m, and y, combinations of any two colors of the solid density values (kc, km, ky, cm, cy, and my), combinations of any three colors of the solid density values (kcm, kcy, kmy, and cmy), and a combination of the four colors (kcmy), is printed. By actually measuring the printed color chart with the IRGB densitometer 1, density values Dk(λ), Dc(λ), Dm(λ), Dy(λ), Dkc(λ), Dkm (λ), Dky(λ), Dcm(λ), Dcy(λ), Dmy(λ), Dkcm(λ), Dkcy(λ), Dkmy(λ), Dcmy(λ), and Dkcmy(A), which correspond to the solid density values k, c, m, y, kc, km, ky, cm, cy, my, kcm, kcy, kmy, cmy, and kcmy, are calculated, and these density values Dk( ) to Dkcmy(λ) are substituted into the above-described Neugebauer equation. And by substituting the actual color mixture halftone screen densities I, R, G, and B measured in step S30 into Dao(λ) of the Neugebauer equation, and solving the quartic simultaneous nonlinear equations, the actual halftone dot area ratios of the printing colors corresponding to the actual color mixture halftone screen densities I, R, G, and B are obtained. In this manner, the actual halftone dot area ratios can be easily calculated from the actual color mixture halftone screen densities. In addition, as in the present embodiment, by measuring the color chart, which consists of the solid k, c, m, and y and combinations of them, kc, km, ky, cm, cy, my, kcm, kcy, kmy, cmy, and kcmy, with the IRGB densitometer 1 to obtain the solid density values, and substituting the obtained solid density values into the Neugebauer equation, the actual halftone dot area ratios can be calculated within a color space corresponding to the solid density values.

If there is a smear (i.e., an ink smear) on a nonprinting area, the value of the actual color mixture halftone screen density becomes greater than 0 and at least one of the actual halftone dot area ratios of the printing colors becomes greater than 0. Therefore, in step S50, the smear determining unit 15 determines whether the actual halftone dot area ratios k, c, m, and y of the printing colors is greater than a threshold value (or a threshold value or greater). If at least one of the actual halftone dot area ratios k, c, m, and y is greater than the threshold value, the smear determining unit 15 determines that there is a smear of that ink. At the same time, the smear determining unit 15 determines which of the dampening-water adjusting zones (left and right nozzle group zones 74L and 74R) has the smear.

If the threshold value for the actual halftone dot area ratios k, c, m, and y is made smaller, a smear of lighter color can be identified. However, because of an error in the conversion from actual color mixture halftone screen densities to actual halftone dot area ratios, the accuracy of the determination of an ink smear will be reduced if the threshold value is made too strong. Therefore, it is preferable to set the threshold value by considering these points. Basically, the threshold value is common to the printing colors.

In step S60, the dampening-water setting unit 16*a* increases and corrects the dampening-water supply Qw, based on the determination result obtained in the smear determining unit 15*a*. That is, for the dampener 70 of the printing unit for the ink corresponding to the smear determined in the smear determining unit 15*a*, the dampening-water supply Qw of the corresponding adjusting zone (left nozzle group zone 74L or right nozzle group zone 74R) is increased by a predetermined constant quantity ΔQw. More specifically, the amount of water from the nozzles (per unit time) is increased by a predetermined quantity.

However, if the dampening-water supply Qw is too great, a floating smear, roller stripping phenomenon, or other disadvantage will be caused, so it has an upper limit value QwMAX. In the case where the dampening-water supply Qw will exceed the upper limit value if it is increased by the predetermined quantity, the dampening-water setting unit 16*a* clips the dampening-water supply Qw at the upper limit value QwMAX.

In response to the corrected dampening-water supply Qw transmitted from the dampening-water setting unit 16 of the arithmetic unit 10, the controller 20 increases the amount of water that is sprayed from the nozzles of the water sprayer 74 of the dampener 70 for each adjusting zone.

After the increase control of the dampening-water supply, the controller 20 starts to count the number of prints from the time of the increase control (step S70). Until the number of prints, N, reaches a predetermined number of prints, N1 (e.g., 100 to a few 100's), the controller 20 is adapted to maintain the dampening-water supply via the judgment in step S80. This is for the reason that time is required to remove an ink smear even after the dampening-water supply has been adjusted. The controller 20 is adapted perform the next dampening-water supply control after reliably grasping the correction result of the dampening-water supply.

The ink smear detection control according to the present embodiment is constructed as described above, so even when a plurality of ink smears overlap each other, which printing colors constitute the smears can be determined easily and reliably.

In addition, because a smear is detected by directing attention to the nonprinting area of the total surface that is printed, detection accuracy is high. Particularly, by setting the measurement area 53 excluding an area of the nonprinting area which is close to a printing area within a predetermined distance, and measuring actual color mixture halftone screen densities to determine an ink smear for each of the printing colors, the mistake of determining an adjacent printing area to be a smear can be prevented.

According to this determination result, the dampening-water supply to the corresponding printing ink unit is controlled to suppress the occurrence of an ink smear. Therefore, even when a plurality of ink smears overlap each other, dampening-water supply is adjusted by properly determining which color printing unit is in a dampening-water state which causes an ink smear. As a result, the occurrence of an ink smear can be reliably prevented.

Increasing dampening-water supply excessively results in excessive emulsification, which causes disadvantages such as a floating smear, roller stripping, etc. However, since the quantity of dampening water is increased within an upper limit value that is set to the dampening-water supply, such disadvantages can be avoided.

Time is required to have the effect of increasing dampening-water supply, but since the next detection of an ink smear is performed after a predetermined number of sheets have been printed, i.e., the effect of increasing dampening-water supply has been obtained, appropriate feedback control can be performed without increasing dampening-water supply excessively.

[Ink Supply Control]

Figure 15:
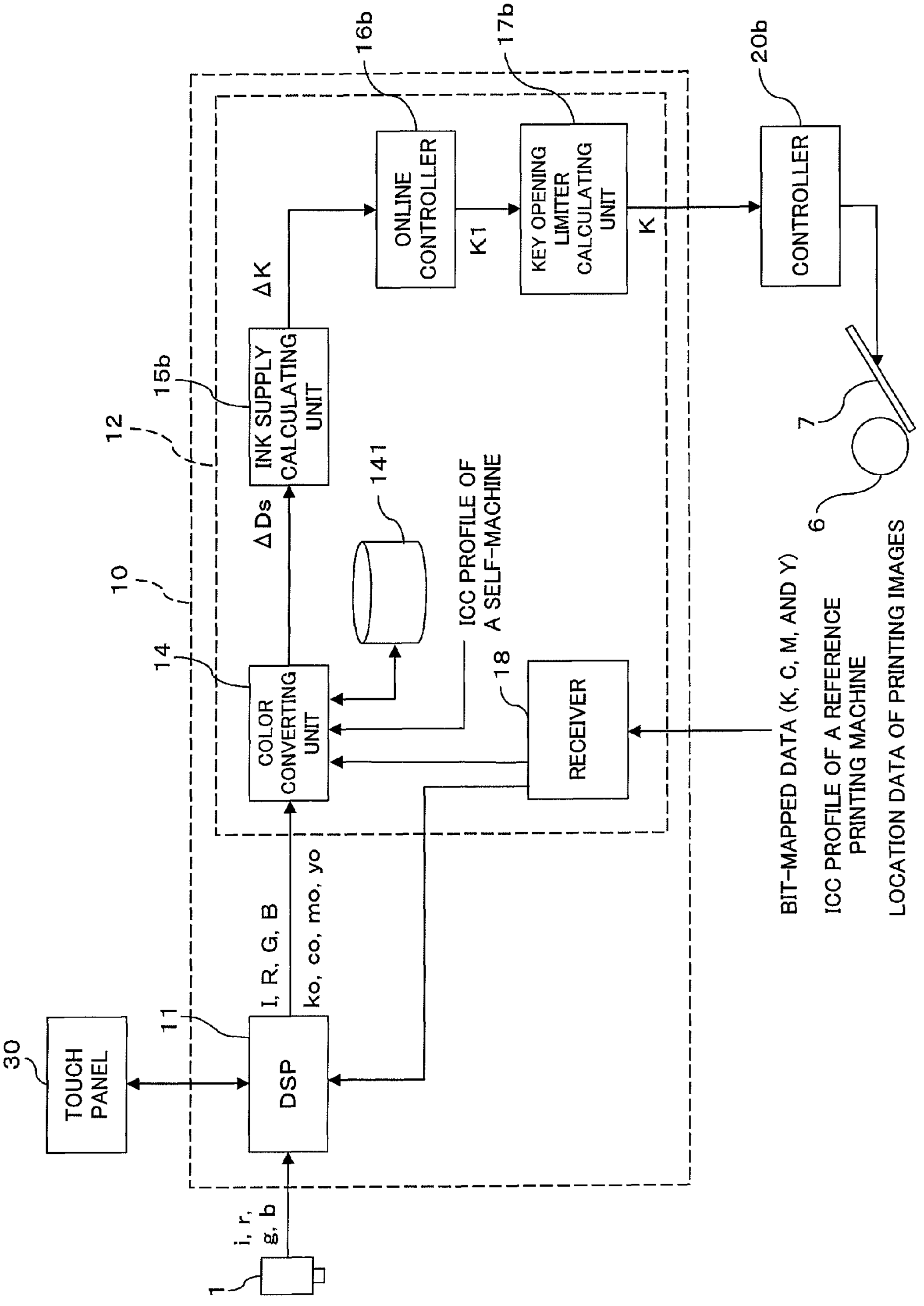
FIG. 15 is a functional block diagram in which attention is directed to the tone control function of the arithmetic unit according to the embodiment of the present invention.

FIG. 15 is a diagram showing a simplified configuration of an image tone controller of the offset rotary newspaper printing machine according to the embodiment of the present invention, and at the same time, is a functional block diagram in which attention is directed to the tone control function of the arithmetic unit 10.

Directing attention to ink supply control, the arithmetic unit 10 is constituted by a digital signal process 11 (which has functions equivalent to pixel-of-interest setting section, halftone dot area ratio calculating section, and actual color mixture halftone screen density measuring section) and a personal computer (PC) 12. The PC 12 functions as a color converting unit 14 (which has functions equivalent to target color mixture halftone screen density setting section, target halftone dot area ratio calculating section, target monochromatic halftone screen density calculating section, actual halftone dot area ratio calculating section, actual monochromatic halftone screen density calculating section, and solid density deviation calculating section), an ink supply calculating unit 15*b*, an online controller 16*b*, a key opening limiter calculating unit 17*b*, and a receiver (receiving section or data acquiring section) 18.

The input of the arithmetic unit 10 is connected with the line sensor IRGB densitometer 1, while the output is connected to a controller 20 incorporated in the printing machine. The controller 20 functions as ink supply adjusting section that adjusts a supply of ink for each key zone of the ink key 7, and is adapted to control an opening and closing unit (not shown) which opens and closes the ink key 7, thereby being able to adjust key openings independently for each ink key 7 of printing units 2*a*, 2*b*, 2*c*, and 2*d*. The arithmetic unit 10 is further connected with a touch panel (display device which has the function of input section) 30.

Figure 16:
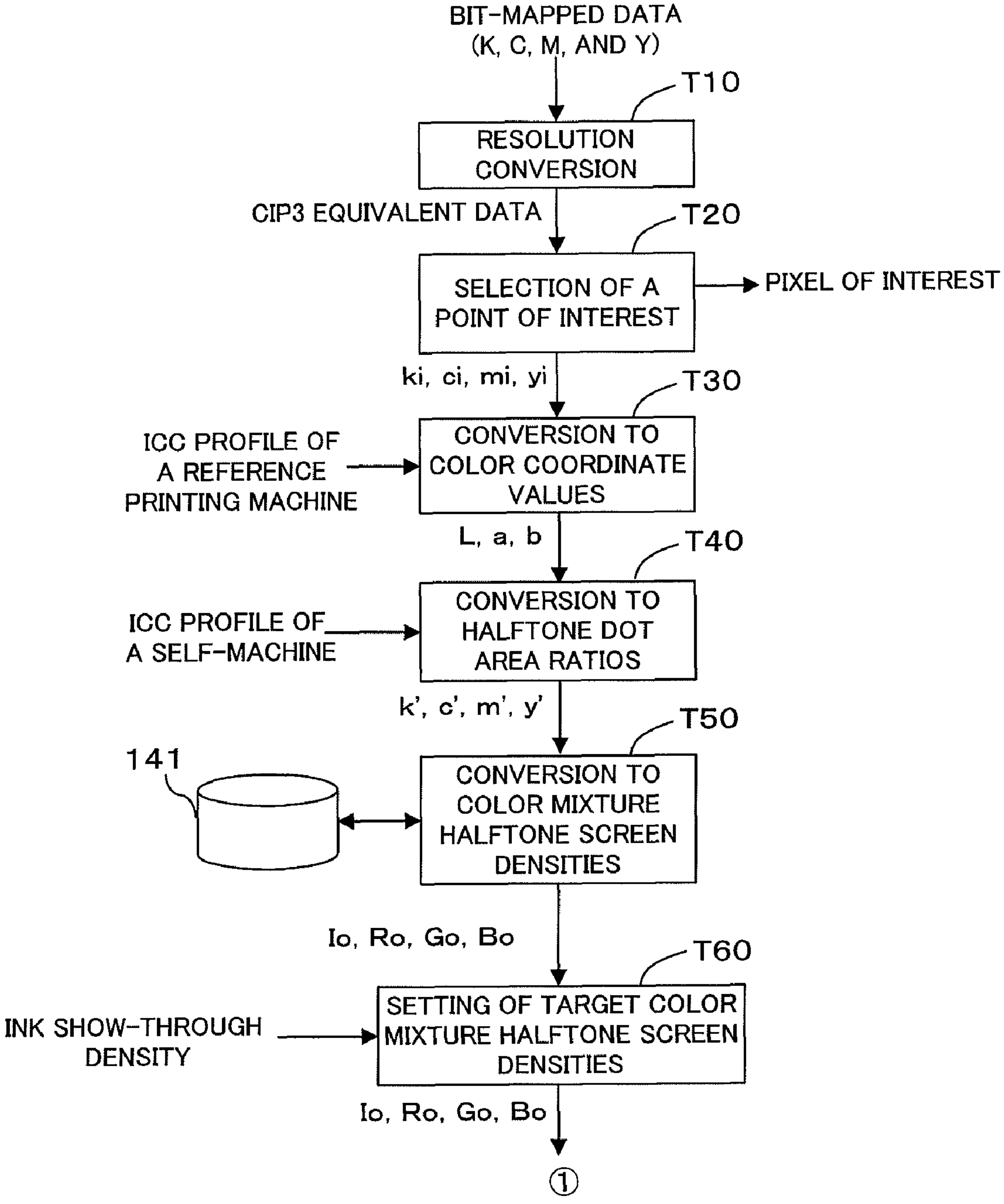
FIG. 16 is a flowchart showing the processing flow of tone control according to the embodiment of the present invention.
Figure 17:
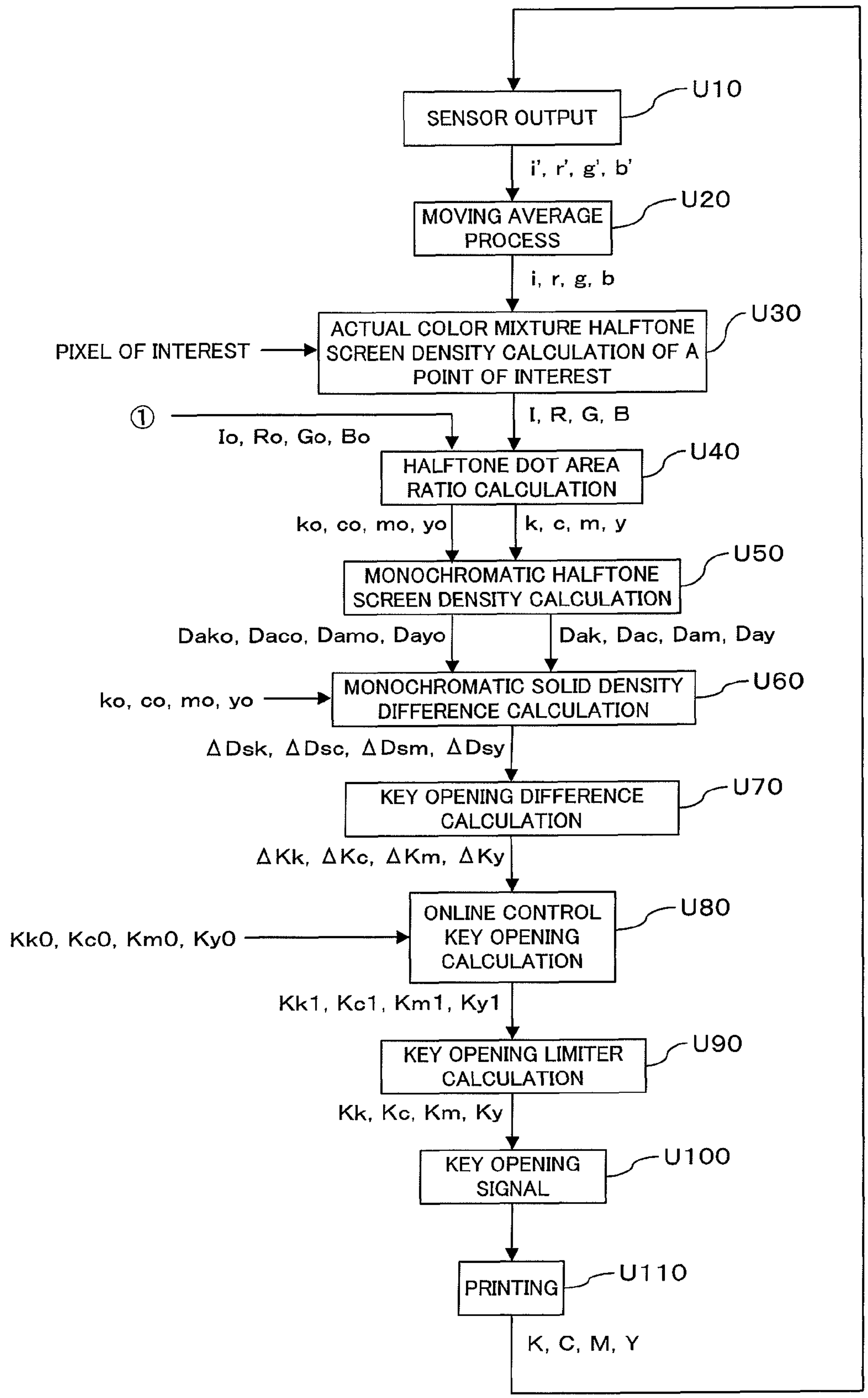
FIG. 17 is a flowchart showing the processing flow of tone control according to the embodiment of the present invention.

FIGS. 16 and 17 are diagrams showing the processing flow of tone control that is carried out in the arithmetic unit 10. The processing of tone control by the arithmetic unit 10 will hereinafter be described with reference to FIGS. 16 and 17. Note that even when the occurrence of ink show-through is estimated by the above-described ink show-through estimating unit 50, a description will be given in the case where tone control is carried out taking ink show-through into account, without being interrupted.

To perform this tone control, the receiver 18 is adapted to acquire the page information (kcmy halftone dot area ratio data of an image to be printed) of a newspaper described above and the ICC (International Color Consortium) profile of an input unit that generated the color information of a page (hereinafter referred to as the ICC profile of a reference printing machine), through a storage medium, a wired or wireless network, and so on. As set forth above, assume that the page information of a newspaper are transmitted in the form of bit-mapped data from the head office of the newspaper publishing company to the printing factories. The ICC profile is also assumed to be a conversion table which prescribes the corresponding relationship between the halftone dot area ratios and color coordinate values of the reference printing machine which become a reference for tone in the current printing.

In step T10, the digital signal processor 11 converts the bit-mapped data acquired through the receiver 18 into low-resolution data equivalent to CIP3 data corresponding to the format of the printing machine, and employs this low-resolution data as halftone dot area ratio data. The resolution conversion process is for the purpose of being shared with general CIP3 data, but it is also possible to employ the bit-mapped data as halftone dot area ratio data. The digital signal processor 11 also is connected with a touch panel 30, on which images on a newspaper page are to be displayed based on the transmitted bit-mapped data.

In step T20, particular points of interest (pixels of interest) corresponding to the printing colors are selected for each key zone by touching areas on the touch panel 30 with a finger, pen, or other object. A point of interest is specified by arbitrarily selecting a particular point on an image and is input to the digital signal processor 11 of the arithmetic unit 10. A point of interest refers to the position of an image which is caused to match with the web 8, particularly a color. As a point of interest, a particular pixel, a plurality of successive pixels, or all pixels can be specified for each key zone. For a key zone in which no point of interest has been specified by the operator, the digital signal processor 11 automatically sets a point of interest. The automatic setting is performed by automatically selecting a pixel whose auto-correlation is greatest with respect to the halftone dot area ratios of all pixels of each color. More specifically, the auto-correlation sensitivity Hc of cyan can be expressed as $Hc=c2/(k+c+m+y)$, using halftone dot area ratio data (k, c, m, y), and a pixel whose auto-correlation sensitivity Hc is highest becomes the point of interest of cyan. Likewise, for the other printing colors, a pixel whose auto-correlation sensitivity is highest is calculated, and is set as the point of interest. In addition, for example, it is possible to automatically set a color which is not contained in an arbitrary image point specified by the operator, and a color whose image area is small.

For one key zone, when a point of interest is constituted by a group of successive pixels or all pixels, the digital signal processor 11 performs an average process on these pixels constituting the point of interest. In addition, for example, when an arbitrary pixel is specified by the operator, or a pixel whose auto-correlation sensitivity is highest is automatically selected, a group of pixels containing the neighboring pixels may be selected as a point of interest, and an average process may be performed on the halftone dot area ratios of this pixel group. The number of neighboring pixels to be contained in a point of interest and a selection pattern may be fixed (for example, 8 pixels surrounding a pixel that was selected or automatically extracted), but by taking into consideration the position within an image of a selected or automatically extracted pixel, it is preferable to perform the pixel setting so that the influence of disturbance is suppressed. Because this reduces variations in measurement data that are caused by the zigzag or shift in top and bottom of a web, stable feedback control becomes possible.

In step T30, the color converting unit 14 converts the halftone dot area ratios ki, ci, mi, and yi of a point of interest input from the digital signal processor 11 into color coordinate values L, a, and b, using the ICC profile of the reference printing machine transmitted from the head office of the newspaper publishing company. After the conversion, in step T40, the color converting unit 14 converts the color coordinate values L, a, and b into halftone dot area ratios k', c', m', and y', using the previously prepared ICC profile of the self-machine. The ICC profile of the self-machine refers to a conversion table that prescribes the corresponding relationship between the halftone dot area ratios and color coordinate values of a printing machine which is controlled in the current printing. Thus, using the ICC profile of the reference printing machine and the ICC profile of a self-machine, halftone dot area ratios corresponding to the self-machine can be calculated from the halftone dot area ratios of an image that is to be printed.

The color converting unit 14, in step T50, converts the halftone dot area ratios k', c', m', and y' of a point of interest into color mixture halftone screen densities Io, Ro, Go, and Bo, using the conversion table stored in the database 141, and in step T60 sets them as target color mixture halftone screen densities Io, Ro, Go, and Bo. The database 141 is used to correlate the halftone dot area ratios and color mixture halftone screen densities of the printing colors and is provided in the color converting unit 14 of the PC 12. The database 141 is made by printing the printed matter of the newspaper printing Japan color standard established by the home committee of the ISO/TC 130, and using data [conversion table which prescribes the corresponding relationship between the halftone dot area ratios (k, c, m, and y), color mixture halftone screen densities (I, R, G, and B), and color coordinate values (L, a, and b) of standard colors] actually measured by the line sensor IRGB densitometer as a reference. Using the target color mixture halftone screen densities Io, Ro, Go, and Bo thus obtained, it becomes possible to cause the tone of a self-machine to match with the tone of the reference printing machine.

After the target color mixture halftone screen densities Io, Ro, Go, and Bo have been set, printing is started and step U10 and subsequent steps shown in FIG. 17 are repeatedly carried out. In step U10, the line sensor IRGB densitometer 1 measures reflected light quantities i', r', g', and b' for each of the pixels of the total surface of the web 8. The reflected light quantities i', r', g', and b' for each pixel measured with the line sensor IRGB densitometer 1 are input to the digital signal processor 11. At the start of the processing flow, the total surface of the web has no printing ink, so the line sensor IRGB densitometer 1 measures the reflected light quantity of the surface having no printing ink and inputs it to the digital signal processor 11.

In step U20, the digital signal processor 11 performs the moving average process on the reflected light quantities i', r', g', and b' of each pixel in units of a predetermined number of sheets, thereby calculating the reflected light quantities i, r, g, and b from which noise components have been removed. In step U30, the reflected light quantities i, r, g, and b are averaged for each point of interest of each key zone, whereby the color mixture halftone screen densities (actual color mixture halftone screen densities) I, R, G, and B are calculated, using the reflected light quantity of the total surface having no ink as a reference. For instance, if the reflected light quantity of infrared light of the printing surface to be printed is represented by ip and the average reflected light quantity of infrared light within the key zone is represented by ik, the actual color mixture halftone screen density I of infrared light is calculated as $I=\log_{10}(ip/ik)$ The color mixture halftone screen densities I, R, G, and B for each point of interest of each key zone calculated in the digital signal processor 11 are input to the color converting unit 14 of the PC 12.

The color converting unit 14 carries out steps U40, U50, and U60. In step U40, the color converting unit 14 calculates the halftone dot area ratios of the printing colors corresponding to the actual color mixture halftone screen densities I, R, G, and B calculated in step U30, respectively. In the calculation, the above-described database 141 is employed, and based on the corresponding relationship stored in the database 141, the halftone dot area ratios of the printing colors corresponding to the actual color mixture halftone screen densities I, R, G, and B are calculated as actual halftone dot area ratios k, c, m, and y. In addition, based on the corresponding relationship stored in the database 141, the color converting unit 14 calculates as target halftone dot area ratios ko, co, mo, and yo the halftone dot area ratios of the printing colors corresponding to the target color mixture halftone screen densities Io, Ro, Go, and Bo obtained in step T60 shown in FIG. 16.

Figure 18:
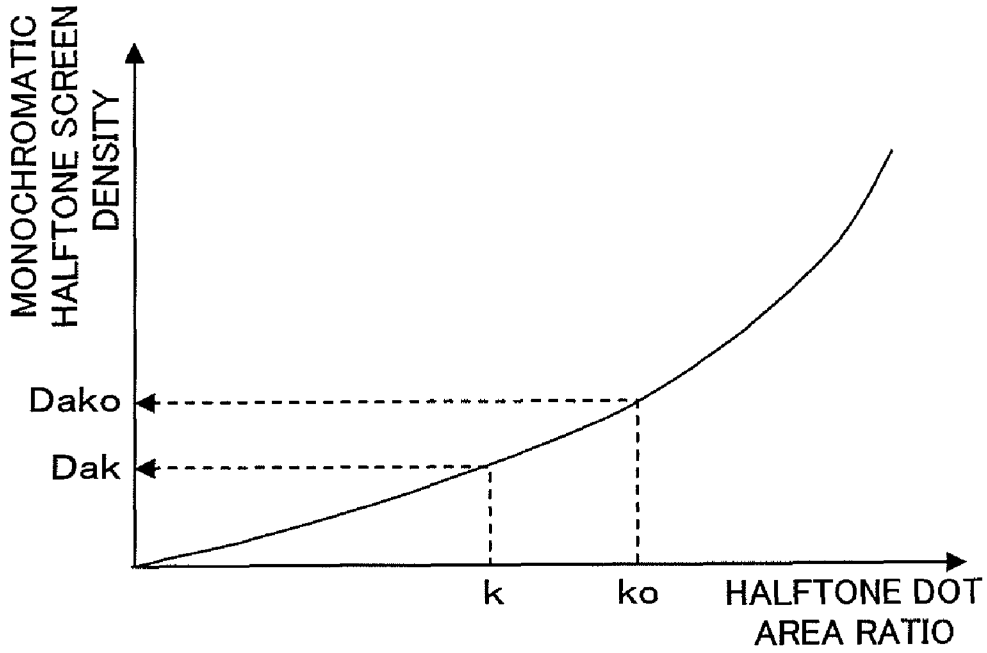
FIG. 18 is a map in which a monochromatic halftone screen density and a halftone dot area ratio are put in correspondence.
Figure 19:
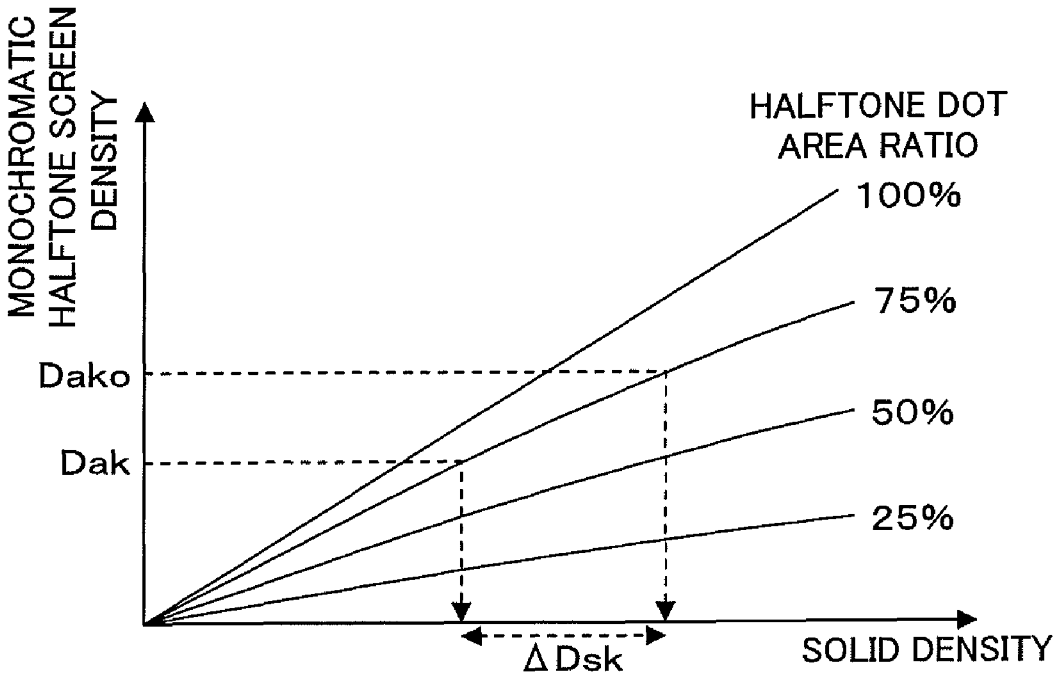
FIG. 19 is a map in which a solid density is put in correspondence with a halftone dot area ratio and a monochromatic halftone screen density.

In step U50, the color converting unit 14 calculates the target monochromatic halftone screen density of the printing colors corresponding to the target halftone dot area ratios ko, co, mo, and yo, and the actual monochromatic halftone screen densities of the printing colors corresponding to the actual halftone dot area ratios k, c, m, and y. In the calculation, a map such as that shown in FIG. 18 is employed. FIG. 18 shows an example of a map in which monochromatic halftone screen densities, actually measured when a halftone dot area ratio is varied, are plotted as a characteristic curve, and the map has been made by using previously measured data. This embodiment employs a map in which an increase in the monochromatic halftone screen density gradually becomes greater as the halftone dot area ratio becomes greater. In the example shown in FIG. 18, by applying the target halftone dot area ratio ko and actual halftone dot area ratio k of India ink to the map, a target monochromatic halftone screen density Dako and an actual monochromatic halftone screen density Dak are calculated from the characteristic curve shown in FIG. 18. In this manner, the color converting unit 14 calculates the target monochromatic halftone screen densities Dako, Daco, Damo, and Dayo and actual target monochromatic halftone screen densities Dak, Dac, Dam, and Day of the printing colors.

In step U60, the color converting unit 14 calculates the solid density differences ΔDsk, ΔDsc, ΔDsm, and ΔDsy of the printing colors which correspond to the differences in density between the target monochromatic halftone screen densities Dako, Daco, Damo, and Dayo and the actual monochromatic halftone screen densities Dak, Dac, Dam, and Day. Note that a solid density depends on a halftone dot area ratio. For the same monochromatic halftone screen density, a solid density becomes lower the higher a halftone dot area ratio. Therefore, the color converting unit 14 performs calculations using a map such as the one shown in FIG. 19. In the figure, there is shown an example of a map in which monochromatic halftone screen densities, actually measured when a monochromatic solid density is varied, are plotted for each halftone dot area ratio as a characteristic curve, and the map has been made by using previously measured data. For each halftone dot area ratio, this embodiment employs a map in which a monochromatic halftone screen density increases linearly or approximately linearly as a solid density becomes greater. The color converting unit 14 selects characteristic curves corresponding to the target halftone dot area ratios ko, co, mo, and yo of the printing colors from the map shown in FIG. 19, and causes the target monochromatic halftone screen densities Dako, Daco, Damo, and Dayo and actual monochromatic halftone screen densities Dak, Dac, Dam, and Day to correspond to the selected characteristic curves to calculate the solid density differences ΔDsk, ΔDsc, ΔDsm, and ΔDsy. In the example shown in FIG. 19, when the target halftone dot area ratio of India ink is 75%, by applying the target monochromatic halftone screen density Dako and actual monochromatic halftone screen density Dak to the map, the solid density difference ΔDsk of India ink is calculated from the 75% characteristic curve in the map.

The solid density differences ΔDsk, ΔDsc, ΔDsm, and ΔDsy of the printing colors calculated in the color converting unit 14 are input to the ink supply calculating unit 15*b*. In step U70, the ink supply calculating unit 15*b* calculates key opening differences ΔKk, ΔKc, ΔKm, and ΔKy that correspond to the solid density differences ΔDsk, ΔDsc, ΔDsm, and ΔDsy. The key opening differences ΔKk, ΔKc, ΔKm, and ΔKy are increased or decreased quantities with respect to the current key openings Kk0, Kc0, Km0, and Ky0 of the ink keys 7 (key openings Kk, Kc, Km, and Ky which were output in the previous processing in step U100 to the controller 20 of the printing machine). The ink supply calculating unit 15 *b* performs calculations employing the well-known API (auto preset inking) function. The API function is a function indicating the corresponding relationship between the halftone dot area ratios (k, c, m, and y) and key openings K(Kk, Kc, Km, and Ky) of the key zones for obtaining reference densities. The halftone dot area ratios can employ the bit-mapped data transmitted from the head office of the newspaper publishing company. More specifically, the ink supply calculating unit 15*b* calculates the ratio kd (kd=ΔDs/Ds) of the solid density difference ΔDs (ΔDsk, ΔDsc, ΔDsm, and ΔDsy) to the reference density Ds (Dsk, Dsc, Dsm, and Dsy), also calculates the key opening K for obtaining reference densities with respect to the halftone dot area ratios using the API function, and calculates a key opening difference ΔK (ΔK=kd×K) for making the solid density difference ΔDs zero as the product of these.

In step U80, the online controller 16*b* corrects the key opening differences ΔKk, ΔKc, ΔKm, and ΔKy calculated in the color converting unit 14, taking into consideration the waste of time from the printing units 2*a*, 2*b*, 2*c*, and 2*d* to the line sensor IRGB densitometer 1, response time of the ink key 7 per time, and print speed. The correction is made allowing for the time lag from when the ink key 7 moves in response to a key opening signal and the key opening is varied to change the amount of ink that is supplied to a web to when a change in reflected light quantity is detected by the IRGB densitometer 1. In online feedback control systems that has a great waste of time, optimum examples are PI control with a function of compensating for a waste of time, fuzzy control, robust control, and so forth. The online controller 16*b* calculates online control key openings Kk1, Kc1, Km1, and Ky1 by adding the current key openings Kk0, Kc0, Km0, and Ky0 to the key opening differences ΔKk, ΔKc, ΔKm, and ΔKy obtained after correction, and inputs the online control key openings Kk1, Kc1, Km1, and Ky1 to the key opening limiter calculating unit 17*b*.

In step U90, the key opening limiter calculating unit 17*b* performs a correction process on the online control key openings Kk1, Kc1, Km1, and Ky1 calculated in the online controller 16*b* to regulate their upper limit values. This is the process for preventing a key opening from excessively increasing because of errors estimated by the color conversion algorithm (processing in steps U40, U50, and U60) in low printing areas. In step U100, the key opening limiter calculating unit 17*b* transmits the key openings Kk, Kc, Km, and Ky whose upper limit values have been regulated, to the controller 20 of the printing machine as key opening signals.

In step U110, the controller 20*b* of the printing machine adjusts the openings of the ink keys 7 of the printing units 2*a*, 2*b*, 2*c*, and 2*d*, based on the key opening signals Kk, Kc, Km, and Ky transmitted from the arithmetic unit 10. This makes it possible to control the ink supply of each printing color, corresponding to target tone for each key zone.

As set forth above, the tone control according to the present embodiment uses the kcmy halftone dot area ratios of an image obtained from a customer, ICC profile of the reference printing machine, and ICC profile of a self-machine to control tone, so that color matching can be accurately and easily performed according to the tone desired by the customer immediately after the start of printing without waiting an OK sheet for being printed. This can significantly reduce the amount of waste paper that occurs until an OK sheet is obtained.

[Others]

While the present invention has been described with reference to the preferred embodiments thereof, the invention is not to be limited to the details given herein, but may be modified within the scope of the invention hereinafter claimed.

In the above embodiment, while it has been described that a plurality of prefecture plates are printed in printing factories, the job selection process by the selectors is not be limited to selecting provincial edition information. For example, in the case of newspaper printing, it is necessary to print the latest information possible, so there are cases where after page data is loaded into the printing machine operation terminal, newer page data is transmitted from the head office of the newspaper publishing company, and printing is performed by replacing the previously loaded page data with the newer page data. Even in such a case, if only a job corresponding to the replaced page data is selected before an instruction for control determination (start of printing) is issued, the new page data is retransmitted to the controllers of the printing presses. Therefore, this can prevent printing control from being performed based on wrong page data, and reduce labor that is required for replacement of pages.

In the above embodiment, while newspaper printing has been described, what is printed is not limited to newspapers. For instance, in the case of printing inserted bills for a group of stores, printing is often performed by replacing a plurality of pieces of neighboring-store information for each area. In this case, page data can be smoothly selected by selecting a job that corresponds to an area to which inserted bills are delivered. The present invention is also applicable to the case where it is necessary to perform printing by replacing a part of a printing plate.

The invention claimed is:

1. A print preparation method using a server that includes a terminal unit connected to the server, said method comprising:

a job selecting step of selecting, which is carried out as a step of pre-printing, one of a number of selective page data pieces for a particular page;

a step of storing printing data in the server, said printing data including a plurality of page data pieces each of which includes platemaking data and related information which is associated with one of a plurality of page, the printing data further including the number of selective page data pieces for the particular page, which has a number of alternative versions and requires a number of printing plates each of which is considered to be a unit; and a step of sending the selected page data piece among the selective page data pieces by the terminal unit to a controller that is connected to the server.

2. The print preparation method according to claim 1, wherein the page data pieces include job information serving as the related information of each of the plurality of pages.

3. The print preparation printing control method as set for in claim 2, where said job selecting step further comprises displaying the plurality of sets of said printing data for selection on said terminal unit, and referring to said terminal unit displaying the plurality of sets of said printing data, selecting one of the plurality of sets of said printing data for selection, through selector equipped with the terminal unit.

4. The print preparation method as set forth in claim 2, further comprising a step of printing including a low-speed printing step of performing printing at adjustment speeds which are relatively low speeds at the time of start while carrying out various adjustments, and a normal printing step of performing printing at normal operating speeds which are relatively high speeds after the various adjustments are completed, wherein said low-speed printing step and said normal printing step have a step of inspecting a print defect based on detection information.

5. The print preparation method as set forth in claim 4, wherein:

in said print defect inspecting step, an inspection threshold level at the time of print defect inspection is set in said low-speed printing step to a gentle product management level whose allowable range for a preset inspection reference value is relatively wide, and is also set in said normal printing step to a strict product management level whose allowable range for the inspection reference value is relatively narrow.

6. The print preparation method as set forth in claim 4, wherein the printing step comprises controlling control elements of each of said printing presses of a printing machine by feedback control which employs detection information sent from an IRGB densitometer of detectors.

7. The print preparation method as set forth in claim 6, wherein said control elements of each of said printing presses include an ink supply unit that adjusts a supply of ink; and the printing step further comprises controlling the supply of ink by the ink supply unit.

8. The print preparation method as set forth in claim 6, wherein:

said pre-printing step further has a print property information acquisition step of acquiring print property information from a printed result of a predetermined reference image by the detectors; and in said printing step, the controller controls the printing presses, based on a target control value calculated from said printing data and/or said command sent from said terminal unit and print property information acquired in the print property acquisition step, and the detection information sent from the detectors.

9. A print preparation system comprising:

a server in which printing data including a plurality of page data pieces each of which includes platemaking data and related information associated with one of a plurality of pages is stored; and a terminal unit, connected to the server, for acquiring the printing data and sending one or more of the plurality of page data pieces to a controller which controls a printing machine, wherein, the printing data includes a number of selective page data pieces for a particular page, which has a number of alternative versions and which requires a number of printing plates each of which is considered to be a unit, which printing plates are exchanged to print the particular page, among the plurality of pages, and said terminal unit includes selection means for selecting one of the selective page data pieces for the particular page, and is operable to send the one selective page data piece selected by said selection means to the controller.

10. The print preparation system according to claim 9, wherein the page data pieces include job information serving as the related information of each of the plurality of pages.

11. The print preparation system according to claim 9, wherein the terminal unit comprises a display device configured for displaying the plurality of sets of said printing data for selection.

12. The print preparation system according to claim 9, wherein the terminal unit is further configured for adjusting a printing speed.

13. The print preparation system according to claim 9, further comprising detectors including an IRGB densitometer and feedback control configured for controlling control elements of each of printing presses of the printing machine and for employing detection information sent from the detectors.

14. The print preparation system according to claim 13, wherein the control elements of each of said printing presses comprises an ink supply unit which is configured for adjusting a supply of ink.

15. The print preparation system according to claim 13, wherein the feedback control is further configured for controlling the supply of ink by the ink supply unit.

16. The print preparation system according to claim 9, wherein the terminal unit is further configured for inspecting a print defect based on detection information sent from the detectors.

17. A terminal unit used in a print system including a server in which printing data including a plurality of page data pieces each of which includes platemaking data and related information associated with one of a plurality of pages is stored, a printing press, having a number of printing units, for printing, detection means, attached to the printing press, for detecting a state of a sheet underwent printing, a controller for controlling each of the printing units based on the page data pieces and information sent from the detecting means, wherein the printing data includes a number of selective page data pieces for a particular page, which has a number of alternative versions and which requires a number of printing plates each of which is considered to be a unit, which printing plates are exchanged to print the particular page, among the plurality of pages, said terminal unit comprising:

selective data displaying means for displaying thereon the selective page data pieces in a pre-printing step, selection means for selecting one of the selective page data pieces displayed on said selective date displaying means, so that said selective data displaying means displays thereon the platemaking data included in the one selective page data piece selected by said selection means, and page data sending means for sending the one selective page data piece selected to the controller.

18. A computer-readable recording medium enclosed with a computer program used for a printing system includes a server in which printing data including a plurality of page data pieces each of which includes platemaking data and related information associated with one of the plurality of pages is stored, a printing press, having a number of printing units, for printing, detection means, attached to the printing press, for detecting a state of a sheet underwent printing, a number of controllers, associated one with each of the printing units, each of which controls the associated printing unit based on the page data pieces and information sent from the detecting means, and a terminal units, serving as a memory and an arithmetic operation unit and connected to the server, for acquiring the printing data and sending one or more of the plurality of page data pieces to each of the controllers, wherein the printing data includes a number of selective page data pieces for a particular page, which has a number of alternative versions and which requires a number of printing plates each of which is considered to be a unit, which printing plates are exchanged to print the particular page, among the plurality of pages; and said program is configured for instructing a computer serving as the terminal unit functioning the memory and the arithmetic operation unit to function as selective data displaying means for displaying thereon the selective page data pieces in a pre-printing step, and selection means for selecting one of the selective page data pieces displayed on said selective data displaying means.

19. A printing system comprising:

a server to store printing data which contains platemaking data of each page of a plurality of pages and related information of said page, for each of said pages;

a printing machine equipped with a plurality of printing presses;

a controller for controlling each of said printing presses;

a terminal unit, connected to said server for acquiring the plurality of printing data and outputting a command to said controller; and detectors attached to said printing machine for detecting a state of a printed page; and said detectors configured for controlling each of said printing presses by said controller based on said printing data and/or said command sent from said terminal unit and detection information sent from said detectors;

wherein:

within said server, as said printing image data for a particular page of said plurality of pages, a plurality of sets of said printing data for selection are stored corresponding to said particular page;

said terminal unit includes selection-data display for displaying said plurality of sets of said printing data for selection, and selectors for selecting one of the plurality of sets of the printing data for selection displayed, and displays information selected by said selectors and transmits the selected information to a corresponding controller of said controllers; and said controllers corresponding to the particular page are configured for controlling the printing press based on the transmitted information said detectors comprises an IRGB densitometer;

said controller is configured for controlling elements of each said printing presses of said printing machine by feedback control which employs detection information sent from said IRGB densitometer;

the printing system further includes an ink supply unit for adjusting a supply of ink which is included in elements that are controlled by each of said printing presses; and said controller is configured for controlling the supply of ink of said ink supply unit, based on said printing data and/or said command sent from said terminal unit and said detection information sent from said detectors.

20. The printing system as set forth in claim 19, further comprising a storage for storing print property information acquired by said detectors from a printed result of a predetermined reference image, wherein said controller is configured to control said printing press, based on a target control value calculated from the printing data and/or said command sent from said terminal unit and said print property information, and the detection information sent from said detectors.

* * * * *